United States Patent
Tanikawa et al.

(10) Patent No.: US 9,460,276 B2
(45) Date of Patent: Oct. 4, 2016

(54) VIRTUAL MACHINE SYSTEM, CONFIDENTIAL INFORMATION PROTECTION METHOD, AND CONFIDENTIAL INFORMATION PROTECTION PROGRAM

(71) Applicant: PANASONIC INTELLECTUAL PROPERTY CORPORATION OF AMERICA, Torrance, CA (US)

(72) Inventors: Tadao Tanikawa, Osaka (JP); Masahiko Saito, Osaka (JP); Katsushige Amano, Kyoto (JP); Toshiaki Takeuchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 37 days.

(21) Appl. No.: 14/008,785

(22) PCT Filed: Feb. 20, 2013

(86) PCT No.: PCT/JP2013/000962
§ 371 (c)(1),
(2) Date: Sep. 30, 2013

(87) PCT Pub. No.: WO2013/125222
PCT Pub. Date: Aug. 29, 2013

(65) Prior Publication Data
US 2014/0020086 A1    Jan. 16, 2014

(30) Foreign Application Priority Data

Feb. 22, 2012  (JP) ................................ 2012-036010

(51) Int. Cl.
*H04L 29/00*   (2006.01)
*G06F 21/30*   (2013.01)
*G06F 21/62*   (2013.01)
*G06F 21/31*   (2013.01)

(52) U.S. Cl.
CPC .............. *G06F 21/30* (2013.01); *G06F 21/31* (2013.01); *G06F 21/62* (2013.01); *G06F 21/6245* (2013.01)

(58) Field of Classification Search
CPC ........................................................ G06F 9/455
USPC .................................................. 718/1; 726/3
See application file for complete search history.

(56) References Cited

U.S. PATENT DOCUMENTS 8,752,046 B2 * 6/2014 Takebe et al. .................... 718/1
2002/0161891 A1  10/2002 Higuchi et al.
(Continued)

FOREIGN PATENT DOCUMENTS

CA            1015063         8/1977
CN         101101575 A        1/2008
(Continued)

OTHER PUBLICATIONS

International Search Report issued May 21, 2013 in International (PCT) Application No. PCT/JP2013/000962.
(Continued)

*Primary Examiner* — Brandon Hoffman
*Assistant Examiner* — Michael D Anderson
(74) *Attorney, Agent, or Firm* — Wenderoth, Lind & Ponack, L.L.P.

(57) ABSTRACT

A virtual machine system that restricts use of confidential information only to the case where an authentication has resulted in success. The virtual machine system includes first virtual machine, second virtual machine, and hypervisor. The first virtual machine includes: storage unit storing confidential information; and authentication unit configured to perform authentication and notify the hypervisor of result of the authentication. The second virtual machine uses virtual device that is virtualized storage device. When having received authentication result indicating authentication success from the authentication unit, the hypervisor enables the second virtual machine to access, as substance of the virtual device, storage area storing the confidential information, and when not having received the authentication result indicating the authentication success from the authentication unit, the hypervisor disables the second virtual machine from accessing the storage area storing the confidential information.

8 Claims, 18 Drawing Sheets

(56) References Cited

U.S. PATENT DOCUMENTS

| | | | |
|---|---|---|---|
| 2006/0010031 A1 | 1/2006 | Higuchi et al. | |
| 2010/0037296 A1* | 2/2010 | Silverstone | 726/3 |
| 2012/0331465 A1 | 12/2012 | Tanikawa | |
| 2013/0111474 A1* | 5/2013 | Agarwal et al. | 718/1 |
| 2013/0212575 A1 | 8/2013 | Ito et al. | |

FOREIGN PATENT DOCUMENTS

| | | |
|---|---|---|
| CN | 101946252 A | 1/2011 |
| JP | 50-23146 | 3/1975 |
| JP | 2001-516913 | 10/2001 |
| JP | 2002-323986 | 11/2002 |
| JP | 2010-55318 | 3/2010 |
| JP | 2010-123148 | 6/2010 |
| JP | 2010-191681 | 9/2010 |
| WO | 99/14652 | 3/1999 |
| WO | 2012/117465 | 9/2012 |

OTHER PUBLICATIONS

Office Action issued May 20, 2016 in corresponding Chinese Application No. 201380001097.1 with partial English translation.

* cited by examiner

VIRTUAL MACHINE SYSTEM, CONFIDENTIAL INFORMATION PROTECTION METHOD, AND CONFIDENTIAL INFORMATION PROTECTION PROGRAM

TECHNICAL FIELD

The present invention relates to a virtual machine system for dealing with confidential information, and in particular to a technology for imposing restriction on the use of the confidential information.

BACKGROUND ART

In recent years, a virtual machine system has been used in an increasing number of information devices, such as tablet devices, that deal with confidential information (see Patent Literature 1). Confidential information is information that is permitted to be used under certain conditions. One example of the confidential information is images of users, or emails.

In a virtual machine system, a user application such as an image viewer or a mailer that deals with confidential information is operated in one virtual machine to realize a function such as image display or email transmission/reception. The one virtual machine restricts use of the confidential information to a user himself/herself by causing the user application to perform a user authentication and permitting use of the confidential information only when the user authentication results in success.

CITATION LIST

Patent Literature

Patent Literature 1: Japanese Patent Application Publication No. S50-23146

SUMMARY OF INVENTION

Meanwhile, according to the above-described technology, the one virtual machine includes a mechanism for performing the user authentication and switching between permitting and prohibiting the use of confidential information in accordance with whether the user authentication has resulted in success or failure. Thus, if the mechanism for switching between permitting and prohibiting the use of confidential information has been tampered with or has a malfunction, it may happen that, although the authentication has not resulted in success, the confidential information held in the one virtual machine is used in the one virtual machine.

It is therefore an object of the present invention to provide a virtual machine system that restricts use of confidential information by a virtual machine only to the case where an authentication has resulted in success.

The above object is fulfilled by a virtual machine system comprising a computer that functions as a first virtual machine, a second virtual machine, and a hypervisor while a program is executed, the hypervisor controlling execution of the first virtual machine and the second virtual machine, the first virtual machine including: a storage unit storing confidential information; and an authentication unit configured to perform an authentication and notify the hypervisor of a result of the authentication, wherein the second virtual machine uses a virtual device that is a virtualized storage device, and when having received an authentication result indicating an authentication success from the authentication unit, the hypervisor enables the second virtual machine to access, as a substance of the virtual device, a storage area storing the confidential information, and when not having received the authentication result indicating the authentication success from the authentication unit, the hypervisor disables the second virtual machine from accessing the storage area storing the confidential information.

With the above-described structure of the virtual machine system of the present invention, the second virtual machine does not have a mechanism for performing an authentication. Thus it is not possible for the second virtual machine to perform an unauthorized operation such as accessing the confidential information by pretending to have been authenticated successfully. The second virtual machine uses the virtual device without recognizing the authentication at all. Whether or not to allow the use of the confidential information is determined based on the result of the authentication performed by the authentication unit of the first virtual machine. Accordingly, the virtual machine system of the present invention can restrict the use of the confidential information by the second virtual machine only to the case where the authentication has resulted in success.

DETAILED DESCRIPTION OF INVENTION

1. Embodiment 1

The following describes a virtual machine system 100 in one embodiment of the present invention.

1.1. Outline

The virtual machine system 100 is, as one example, an information device that deals with confidential information such as user information. In the present embodiment, privilege information is used as one example of the confidential information. The privilege information is information that can be used by a first virtual machine, and basically cannot be used by a second virtual machine, but can be used by the second virtual machine only when a predetermined condition is satisfied, namely, when it has a privilege that a user authentication by the authentication code has resulted in success.

The virtual machine system 100 includes the first virtual machine on which a secure OS (Operating System) and the like operate; the second virtual machine on which a general OS and the like operate; and a hypervisor that controls the execution of the first and second virtual machines. An application program that requests a use of the privilege information operates on the second virtual machine, while the privilege information is held by the first virtual machine. Furthermore, in the virtual machine system 100, what determines whether or not to permit use of the privilege information is the hypervisor, not the second virtual machine that actually uses the privilege information, the hypervisor determining whether or not to permit use of the privilege information based on the result of the authentication performed by the first virtual machine.

This structure prevents an occurrence of a problem that might occur if the second virtual machine had an authentication mechanism for controlling whether or not to permit use of the privilege information, namely, a problem where the authentication mechanism is, for example, tampered with and the privilege information is used by the second virtual machine although the authentication has actually resulted in failure.

1.2. Structure 1.2.1. Hardware Structure

Figure 1:
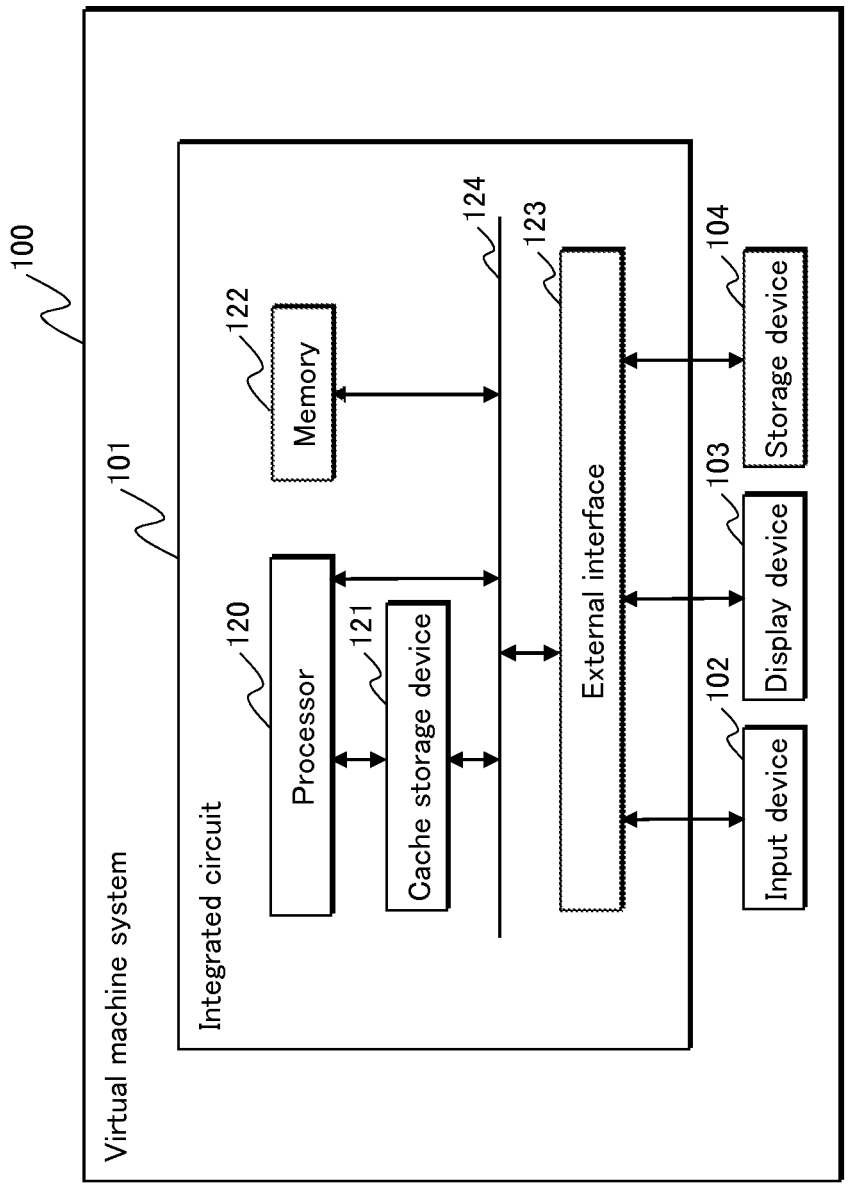
FIG. 1 is a block diagram illustrating the main hardware structure of the virtual machine system in Embodiment 1 of the present invention.

FIG. 1 is a block diagram illustrating the main hardware structure of the virtual machine system 100 in one embodiment of the present invention.

As illustrated in FIG. 1, the virtual machine system 100 is, as hardware, a computer, and includes an integrated circuit 101, an input device 102, a display device 103, and a storage device 104. The integrated circuit 101 includes a processor 120, a cache storage device 121, a memory 122, an external interface 123, and a bus 124.

The memory 122, connected with the bus 124, is composed of a RAM (Random Access Memory) and stores: a program that defines the operation of the processor 120; data used by the processor 120.

The cache storage device 121, connected with the processor 120 and bus 124, is a cache memory composed of a memory that operates at a higher speed than the memory 122. The cache storage device 121 has a cache function to temporarily store data that is used frequently, among the data stored in the memory 122.

The bus 124, connecting the processor 120, cache storage device 121, memory 122, and external interface 123, has a function to transmit signals between the circuits connected thereby.

The external interface 123 is connected with the bus 124, input device 102, display device 103, and storage device 104. The external interface 123 has a function to mediate the transfer of signals between connected circuits.

The input device 102 includes a keyboard and a mouse and is connected with the external interface 123. The input device 102 has a function to, under the control of the processor 120 executing a program, receive input information that is input by the user of the virtual machine system 100 by operating the keyboard, mouse or the like.

The display device 103 includes a display or the like and is connected with the external interface 123. The display device 103 is controlled by the processor 120 executing a program and has a function to display an image, a character sequence or the like based on signals sent from the processor 120.

The storage device 104 is composed of a nonvolatile storage medium such as a flash memory, and is connected with the external interface 123. The storage device 104 is controlled by the processor 120 and has a function to store data.

The processor 120 is connected with the cache storage device 121 and bus 124. The processor 120 reads a program from the memory 122 via the cache storage device 121 and executes the program, thereby functioning as a first virtual machine 201, a second virtual machine 202, and a hypervisor 203 that controls the execution of the first and second virtual machines, as described below. Furthermore, the processor 120 controls the input device 102, display device 103, and storage device 104 by transmitting and receiving various types of control signals to/from the external interface 123 via the bus 124.

1.2.2. Functional Structure

The following describes the functional structure of the virtual machine system 100, which has the hardware structure of FIG. 1 described above, with reference to the accompanying drawings.

Figure 2:
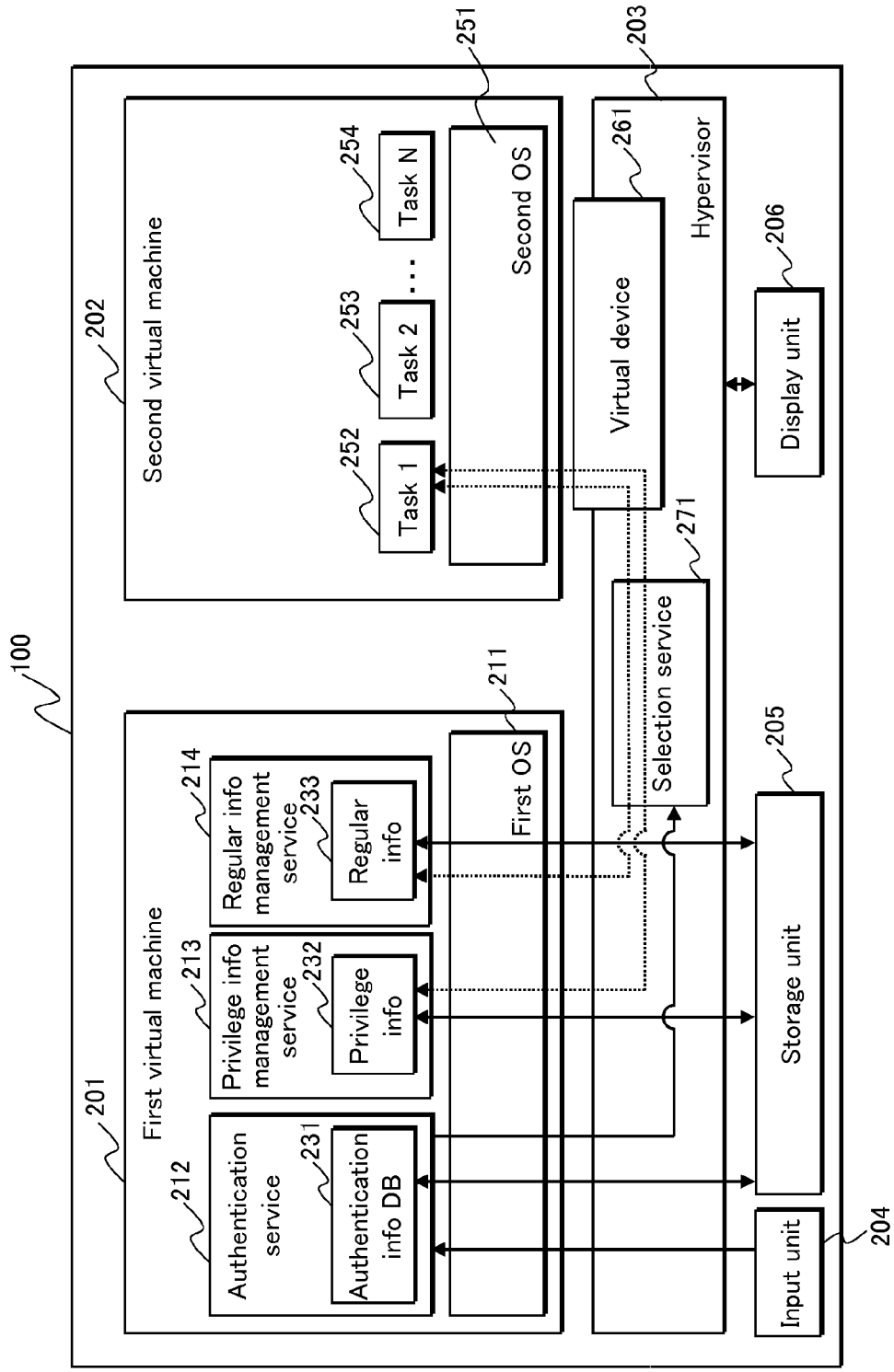
FIG. 2 is a diagram schematically illustrating the functional structure of the virtual machine system in Embodiment 1 of the present invention.

FIG. 2 is a diagram schematically illustrating the functional structure of the virtual machine system 100.

As illustrated in FIG. 2, the virtual machine system 100 includes a first virtual machine 201, a second virtual machine 202, a hypervisor 203, an input unit 204, a storage unit 205, and a display unit 206.

Input Unit 204, Storage Unit 205, Display Unit 206

The input unit 204 is composed of the input device 102, and has a function to, upon receiving a piece of input information that is input by the user by operating the input device 102, appropriately assign the received piece of input information to either the first virtual machine 201 or the second virtual machine 202 and notifies the first virtual machine 201 or the second virtual machine 202 of the piece of input information.

The storage unit 205 is composed of the storage device 104 and has a function to store data. In the present embodiment, the storage unit 205 stores an authentication information database (DB) 231, privilege information 232, and regular information 233. Here, the privilege information 232 is privilege information that can be used when a user authentication by an authentication code results in success, and as one example, is image data including 10 images. The regular information 233 is information for use of which no condition is imposed in particular, and as one example, is image data including five images.

The display unit 206 is composed of the display device 103 and has a function to display an image, a character sequence or the like that the first virtual machine 201 or the second virtual machine 202 requests to display.

Note that, between a block composed of the input unit 204, storage unit 205 and display unit 206 and a block composed of the first virtual machine 201 and second virtual machine 202, data is transferred via the hypervisor 203. In the following, description of data being transferred via the hypervisor 203 is omitted unless it is required in particular.

First Virtual Machine 201

The first virtual machine 201 is a virtual machine that realizes a first OS 211 and information processing performed by a task group executed under the control of the first OS 211, by using hardware resources allocated by the hypervisor 203.

(1) First OS 211

The first OS 211 is a secure OS in which security functions are more enhanced than in general OSs, the security functions including a function to detect an invasion from outside and protect therefrom, and a function to protect files. The first OS 211 has a function to control executions of tasks such as an authentication service 212, a privilege information management service 213, and a regular information management service 214. In the following, the tasks whose execution is controlled by the first OS 211 are collectively called "management tasks".

Note that the transfer of signals and data between each management task and the hypervisor is performed via the first OS 211 in reality. In the following, description of transfer being performed via the first OS 211 is omitted unless it is required in particular.

(2) Authentication Service 212

The authentication service 212 has an authentication function (see FIG. 4) to perform authentication of the user of the virtual machine system 100. The authentication service 212 reads the authentication information DB 231 from the storage unit 205 and uses the authentication information DB 231 in the authentication. Here, the authentication information DB 231 is a database storing authentication codes. The authentication codes are, as one example, passwords.

The authentication service 212 realizes the authentication function as follows. First, the authentication service 212 waits for an authentication code, which is input by the user, to be notified from the input unit 204. Upon receiving the authentication code, the authentication service 212 checks whether or not the authentication code is recorded in the authentication information DB 231, and when the authentication code is recorded, determines that the authentication is a success; and when the authentication code is not recorded, determines that the authentication is a failure.

When it determines that the authentication is a success, the authentication service 212 transmits a signal indicating an authentication success to the hypervisor 203 as an information selection signal. When it determines that the authentication is a failure, the authentication service 212 transmits a signal indicating an authentication failure to the hypervisor 203 as an information selection signal.

Also, the authentication service 212 receives an authentication cancellation instruction, which is input by the user, from the input unit 204. Upon receiving the authentication cancellation instruction, the authentication service 212 transmits a signal indicating an authentication failure to the hypervisor 203 as an information selection signal.

Note that it is assumed that the first OS 211 and the hypervisor 203 perform controls such that only the authentication service 212 can read and write the authentication information DB 231 from/to the storage unit 205.

(3) Privilege Information Management Service 213, Regular Information Management Service 214

The privilege information management service 213 has a function to manage the privilege information 232. As the management of the privilege information 232, the privilege information management service 213 reads the privilege information 232 from the storage unit 205, and holds the privilege information 232. The privilege information management service 213 also notifies the hypervisor 203 of a logical address of a storage area holding the privilege information 232 (the logical address is an address in a logical address space managed by the first OS 211. Hereinafter, the logical address is referred to as a "privilege information logical address"). Note also that hereinafter a physical address of the storage area holding the privilege information 232 is referred to as a "privilege information physical address".

Note that it is assumed that the first OS 211 and the hypervisor 203 perform controls such that only the privilege information management service 213 can read and write the privilege information 232 from/to the storage unit 205.

The regular information management service 214 has a function to manage the regular information 233. As the management of the regular information 233, the regular information management service 214 reads the regular information 233 from the storage unit 205, and holds the regular information 233. The regular information management service 214 also notifies the hypervisor 203 of a logical address of a storage area holding the regular information 233 (the logical address is an address in the logical address space managed by the first OS 211. Hereinafter, the logical address is referred to as a "regular information logical address"). Note also that hereinafter a physical address of the storage area holding the regular information 233 is referred to as a "regular information physical address".

Note that it is assumed that the first OS 211 and the hypervisor 203 perform controls such that only by the regular information management service 214 can read and write the regular information 233 from/to the storage unit 205.

Second Virtual Machine 202

The second virtual machine 202 is a virtual machine that realizes a second OS 251 and information processing performed by a task group whose execution is controlled by the second OS 251, by using hardware resources allocated by the hypervisor 203. The task group whose execution is controlled by the second OS 251 includes a task 1 252, a task 2 253, . . . a task N (N is an arbitrary natural number) 254. In the following, the tasks whose executions are controlled by the second OS 251 are collectively called "general tasks".

(1) Second OS 251

The second OS 251 is a general OS, not a secure OS, and has a function to perform control of executions of the tasks 1 252 to N 254.

Also, the second OS 251 includes an interface (hereinafter referred to as a "virtual device interface") that is used by a general task when it requests a virtual device 261 to access data. The virtual device 261 is a virtual device that is regarded as a device that stores information such as a data sequence, file (group), and folder (group). The virtual device 261 is realized by the virtual device provision function of the hypervisor 203.

(2) Task 1 252, Task 2 253, . . . Task N 254

The tasks 1 252 to N 254 are units of executing a process, and are implemented as programs created by the user or application vendor.

In the present embodiment, the task 1 252 is assumed to be, as one example, an application program that performs an image display. Also, it is assumed that the task 1 252 recognizes, in advance, that display-target image data is stored in the virtual device 261, but does not recognize what types of image data are stored in the virtual device 261. When displaying an image, the task 1 252 uses the virtual device interface to request the virtual device 261 to read image data. After the image data is read from the virtual device 261, the task 1 252 displays the read image data on the display unit 206.

Note that, in the present embodiment, the image data read from the virtual device 261 is assumed to include various types of information (hereinafter referred to as "header information") used for extracting images from the image data at a predetermined position, such as the head of the image data (hereinafter referred to as "header"), the various types of information including the number of images included in the image data, and recording positions of the images included in the image data. The task 1 252 extracts the images from the image data by referring to the header information.

Hypervisor 203

The hypervisor 203 is a control program that includes a plurality of virtual machine environments that are generated by virtualizing the hardware with the software, and causes the virtual machines, which include OSs, to operate by using the virtual machine environments. The hypervisor 203 has, as major functions, a scheduling function, mapping function, and virtual device provision function. The hypervisor 203 includes a selection service 271 that mainly realizes the virtual device provision function.

(1) Scheduling Function

The scheduling function is a function to allocate hardware resources of the virtual machine system 100 to the first virtual machine 201 and the second virtual machine 202. The hypervisor 203 allocate each hardware resource to each virtual machine based on a scheduling method (time-sharing method, fixed allocation method or the like) that is determined in advance depending on that hardware resource.

(2) Mapping Function

Figure 5:
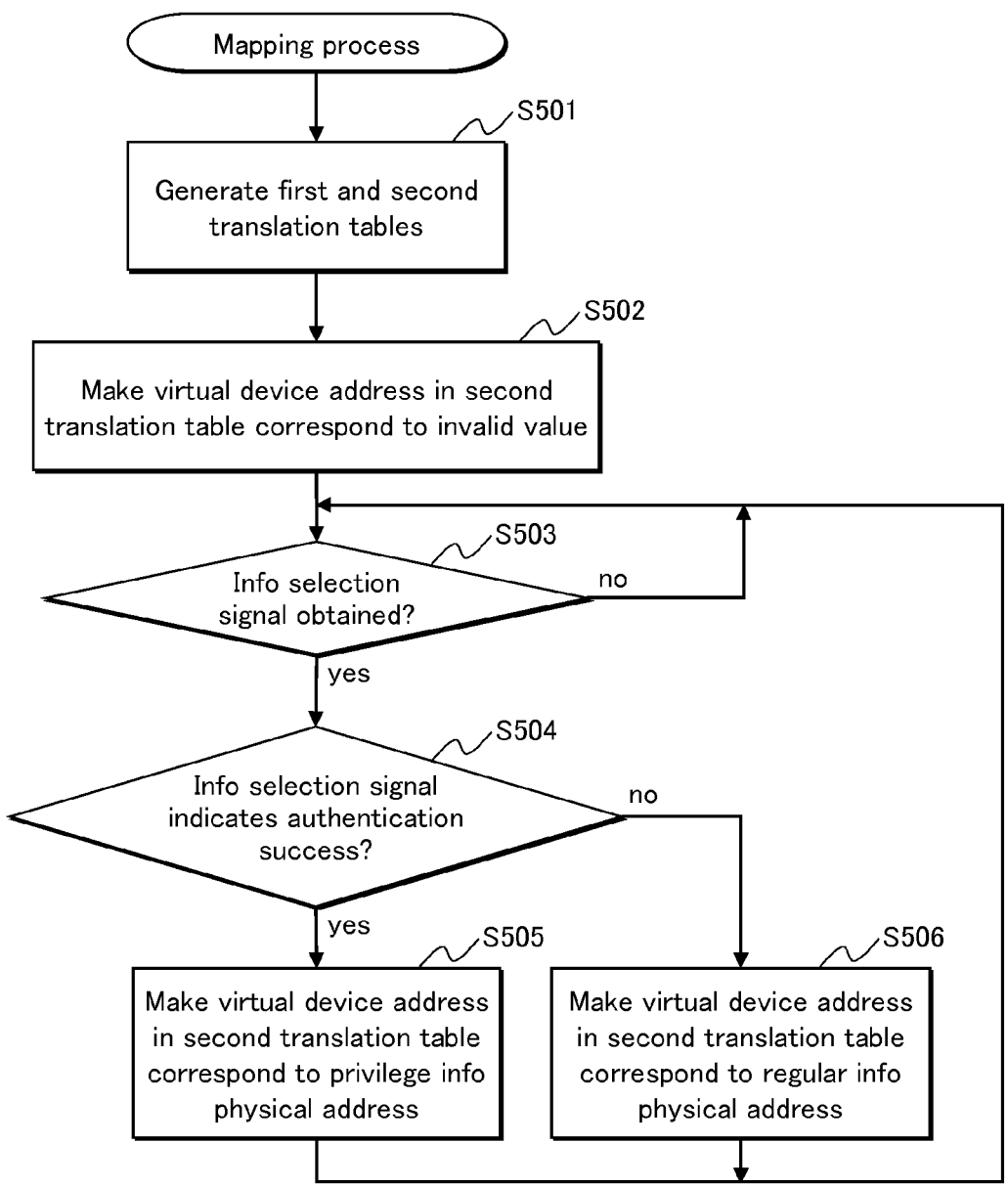
FIG. 5 is a flowchart illustrating one example of the mapping process in Embodiment 1 of the present invention.

The mapping function is a function to allocate physical memory areas, which are storage areas of the memory 122, to the first virtual machine 201 and the second virtual machine 202, and manage the correspondence between the logical addresses and the physical addresses (see FIG. 5). The first virtual machine 201 and the second virtual machine 202 manage the allocated physical memory areas as logical memory areas. That is to say, the first virtual machine 201 and the second virtual machine 202 identify each storage area in the allocated memory areas by using a logical address.

Figure 3:
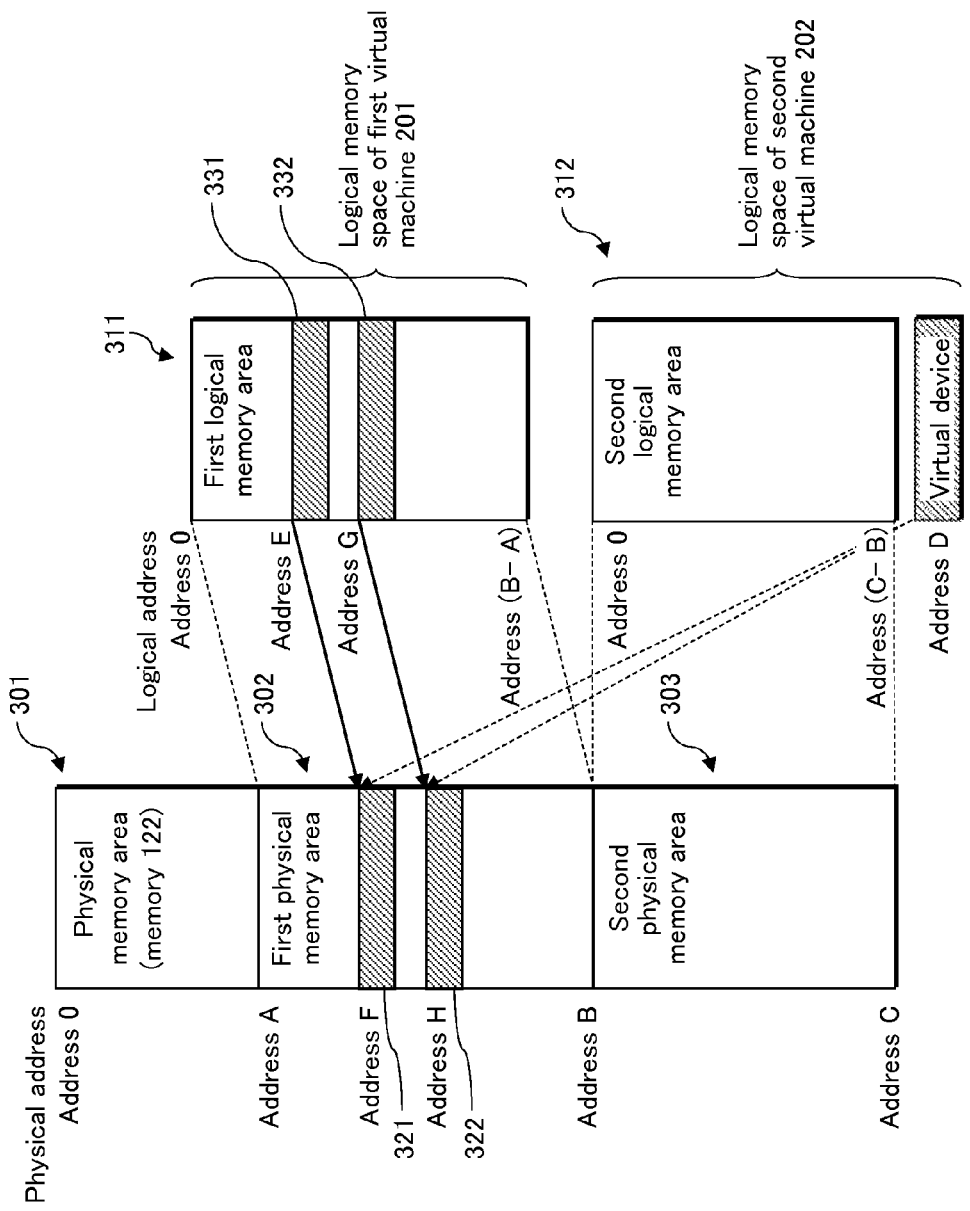
FIG. 3 is a diagram schematically illustrating the mapping in Embodiment 1 of the present invention.

FIG. 3 is a diagram schematically illustrating the correspondence between the logical addresses and the physical addresses (hereinafter merely referred to as "mapping").

A physical memory area 301 in FIG. 3 schematically illustrates the whole storage area of the memory 122. It is assumed here that the physical memory area 301 is divided into locations that are assigned with physical addresses 0 to C, respectively. Note that in the present embodiment, each physical address and each logical address is represented by 32 bits as one example.

The hypervisor 203 allocates a first physical memory area 302, which is a part of the physical memory area 301 ranging from physical address A to physical address B, to the first virtual machine 201. The first virtual machine 201 recognizes the first physical memory area 302 as a first logical memory area 311. The first logical memory area 311 is generated by translating the physical addresses of the first physical memory area 302 to logical addresses. That is to say, the first logical memory area 311 is the same as the first physical memory area 302 in substance.

The hypervisor 203 allocates a second physical memory area 303, which is a part of the physical memory area 301 ranging from physical address B to physical address C, to the second virtual machine 202. The second virtual machine 202 recognizes the second physical memory area 303 as a second logical memory area 312. The second logical memory area 312 is generated by translating the physical addresses of the second physical memory area 302 to logical addresses. That is to say, the second logical memory area 312 is the same as the second physical memory area 303 in substance.

The translation between logical addresses and physical addresses is performed by the hypervisor 203. The hypervisor 203 generates and holds a table (hereinafter referred to as "first translation table" in the present embodiment) that is used for translation between the logical addresses used by the first virtual machine 201 and the physical addresses. More specifically, the first translation table shows the correspondence between the logical addresses of the first logical memory area 311 and the physical addresses of the first physical memory area 302. The hypervisor 203, upon receiving an access request with a logical address specified from the first virtual machine 201, translates the specified logical address to a physical address by using the first translation table, and accesses a storage area identified by the physical address.

The hypervisor 203 generates and holds a table (hereinafter referred to as "second translation table" in the present embodiment) that is used for translation between the logical addresses used by the second virtual machine 202 and the physical addresses. More specifically, the second translation table shows the correspondence between the logical addresses of the second logical memory area 312 and the physical addresses of the second physical memory area 303. The hypervisor 203, upon receiving an access request with a logical address specified from the second virtual machine 202, translates the specified logical address to a physical address by using the second translation table, and accesses a storage area identified by the physical address.

The following describes in specific examples how reading and writing of data from/to a storage area are performed with a logical address specified.

As one example, in the first translation table, address E of the first logical memory area 311 corresponds to address F of the first physical memory area 302. In this case, upon receiving a data read request with a logical address (in this example, address E of the first logical memory area 311 illustrated in FIG. 3) specified from the first virtual machine 201, the hypervisor 203 translates the specified logical address to a physical address (in this example, address F of the first physical memory area 302 illustrated in FIG. 3) by using the first translation table, and reads data from a storage area 321 that is identified by the physical address, and passes the read data to the first virtual machine 201.

Also, in the first translation table, address G of the first logical memory area 311 corresponds to address H of the first physical memory area 302. In this case, upon receiving a data write request with a logical address (in this example, address G of the first logical memory area 311 illustrated in FIG. 3) specified from the first virtual machine 201, the hypervisor 203 translates the specified logical address to a physical address (in this example, address H of the first physical memory area 302 illustrated in FIG. 3) by using the first translation table, and writes data to a storage area 322 that is identified by the physical address.

(3) Virtual Device Provision Function

Figure 6:
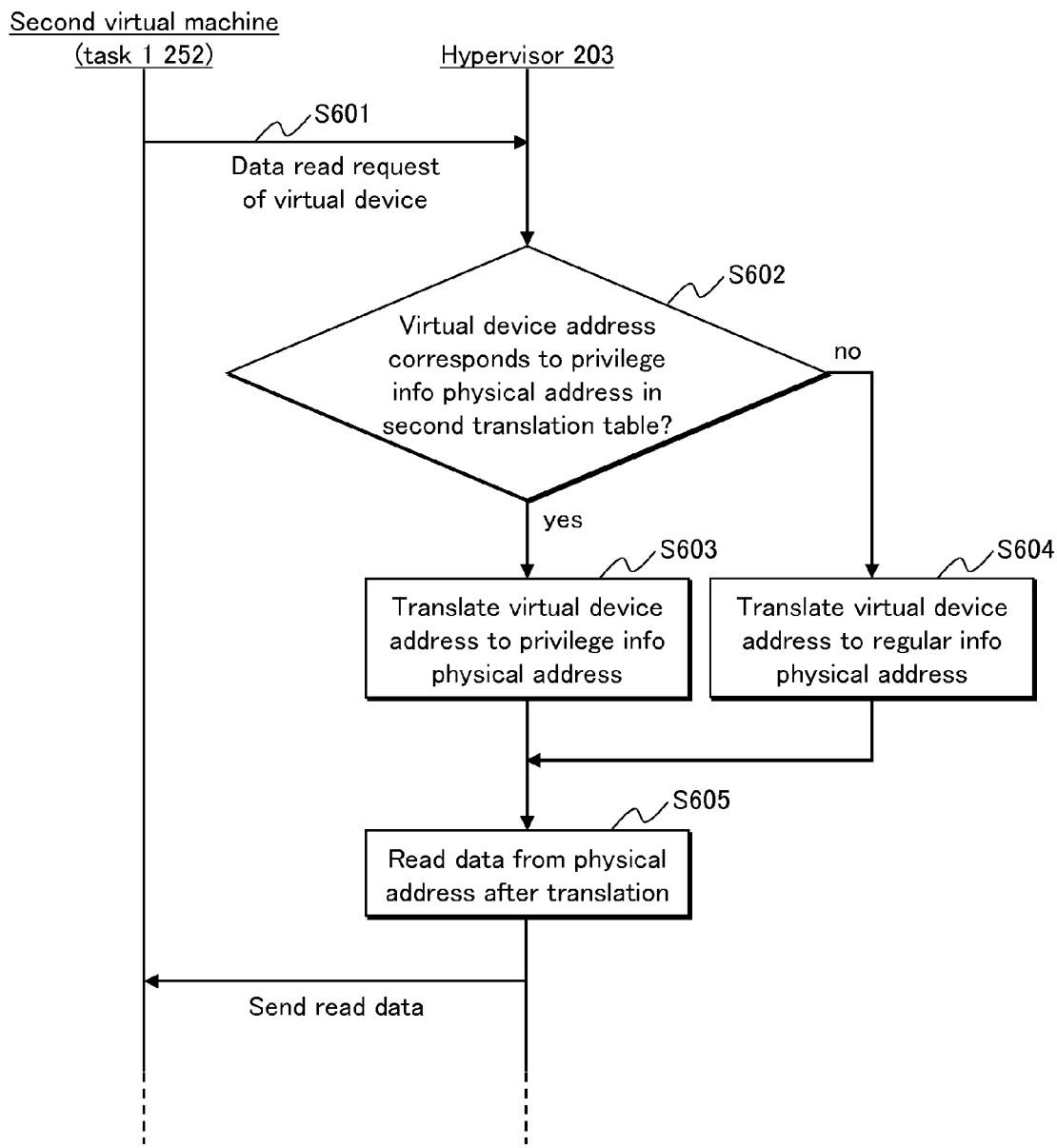
FIG. 6 is a flowchart illustrating one example of the data read process of the virtual device in Embodiment 1 of the present invention.
Figure 7:
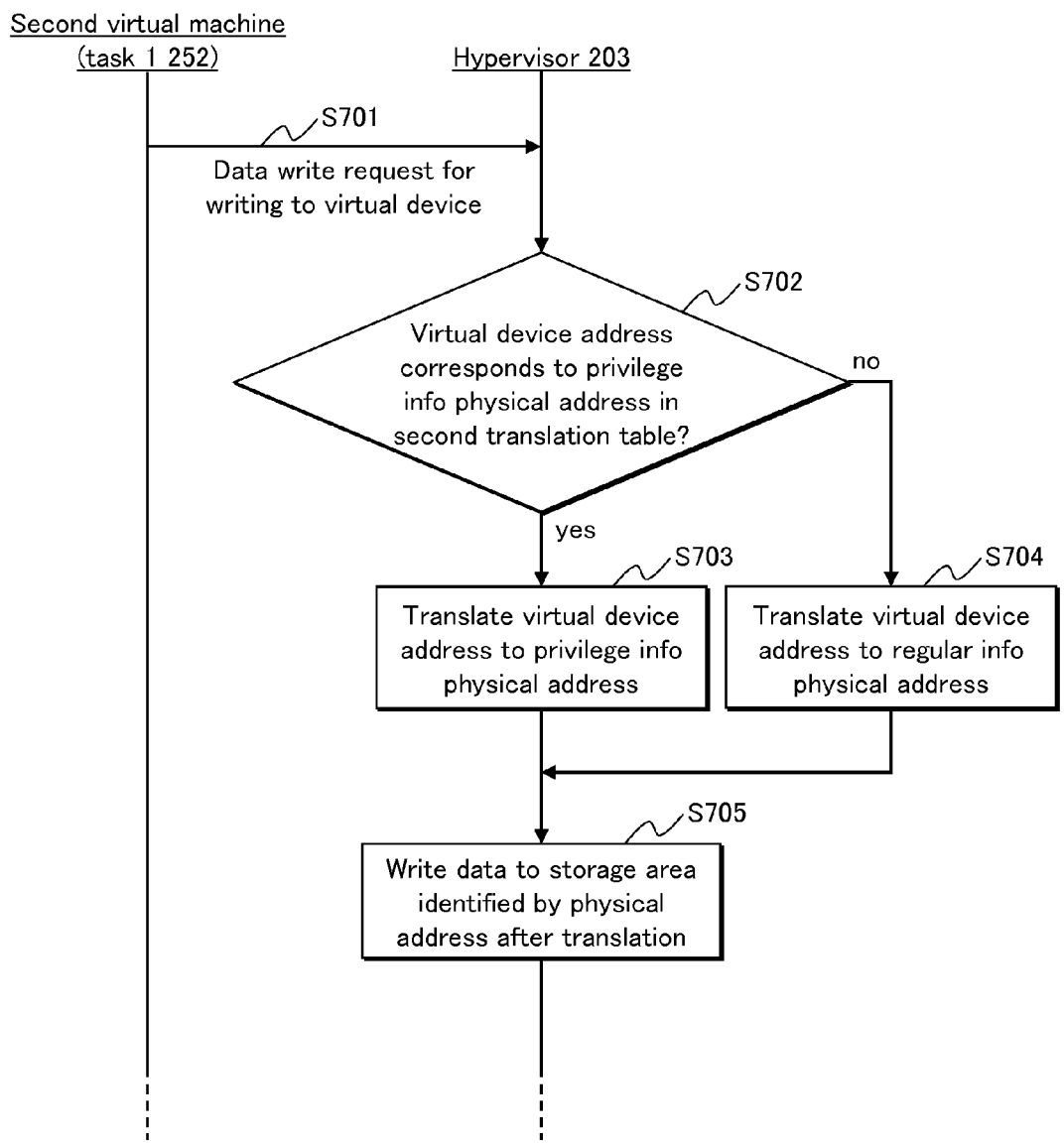
FIG. 7 is a flowchart illustrating one example of the data write process for writing data to the virtual device in Embodiment 1 of the present invention.

The virtual device provision function is a function to perform a control such that, only when the authentication performed by the authentication service 212 of the first virtual machine 201 results in success, a general task of the second virtual machine 202 is allowed to access the privilege information 232 stored in the first virtual machine 201 by using the virtual device 261 (see FIGS. 6 and 7). It is assumed here that, in the virtual machine system 100, logical addresses (hereinafter referred to as "virtual device addresses") identifying virtual storage areas in the virtual device 261 have been determined as the virtual device interface.

The virtual device provision function is realized as follows. That is to say, the selection service 271 of the hypervisor 203 describes, in the second translation table, a virtual device address (in this example, address D as illustrated in FIG. 3) and a physical address that corresponds to the virtual device address. The selection service 271, upon receiving an information selection signal from the authentication service 212, changes the physical address that corresponds to the virtual device address, in accordance with the content of the received information selection signal.

In the present embodiment, when the received information selection signal indicates an authentication success, the selection service 271, in the second translation table, makes the virtual device address correspond to a physical address of a storage area storing the privilege information 232. Also, when the received information selection signal indicates an authentication failure, the selection service 271, in the second translation table, makes the virtual device address correspond to a physical address of a storage area storing the regular information 233. Note that, when the second translation table is generated, the selection service 271 makes the virtual device address correspond to, as an initial value of the physical address that corresponds to the virtual device address, an invalid value (for example, 0xFFFFFFFF) that is defined in advance in the virtual machine system 100 as a value indicating an invalid address.

Upon receiving a data read request with the virtual device address specified from the second virtual machine 202, the hypervisor 203 refers to the second translation table and translates the virtual device address to the physical address that corresponds to the virtual device address in the second translation table. The hypervisor 203 then reads data from a storage area identified by the physical address, and passes the read data to the second virtual machine 202. Upon receiving a data write request with the virtual device address specified from the second virtual machine 202, the hypervisor 203 refers to the second translation table and translates the virtual device address to the physical address that corresponds to the virtual device address in the second translation table. The hypervisor 203 then writes data to a storage area identified by the physical address.

Note that when the hypervisor 203 receives a data read request or a data write request with a virtual device address specified from the second virtual machine 202 and finds, by referring to the second translation table, that the specified virtual device address corresponds to an invalid value, the hypervisor 203 notifies the second virtual machine 202 of an access error.

Specific Example

Here, the virtual device provision function is explained with reference to FIG. 3 by taking a specific example. It is assumed as a premise that the privilege information 232 is stored in a storage area 321 located at physical address F. The physical address of the storage area storing the privilege information is referred to as "privilege information physical address", and in this example, the privilege information physical address is address F. Also, the logical address of the storage area storing the privilege information is referred to as "privilege information logical address", and in this example, the privilege information logical address is address E. It is also assumed that the selection service 271 has already been notified of the privilege information logical address from the privilege information management service 213.

Also, it is assumed that the regular information 233 is stored in a storage area 322 located at physical address H. The physical address of the storage area storing the regular information is referred to as "regular information physical address", and in this example, the regular information physical address is address H. Also, the logical address of the storage area storing the regular information is referred to as "regular information logical address", and in this example, the regular information logical address is address G. It is also assumed that the selection service 271 has already been notified of the regular information logical address from the regular information management service 214.

Premised on the above, first, the selection service 271 receives an information selection signal from the authentication service 212 of the first virtual machine 201. When the received information selection signal indicates an authentication success, the selection service 271 changes the physical address, which is indicated in the second translation table to correspond to the virtual device address, to the privilege information physical address.

Subsequently, upon receiving from the task 1 252 of the second virtual machine 202 a data read request with the virtual device address specified, to read data from the virtual device 261, the selection service 271 translates the virtual device address to the privilege information physical address, namely the physical address indicated in the second translation table to correspond to the virtual device address. The virtual device 261 then reads the privilege information 232 from the storage area 321 that is identified by the privilege information physical address, and passes the privilege information 232 to the task 1 252.

Also, upon receiving from the task 1 252 a data write request with the virtual device address specified, to write data to the virtual device 261, the selection service 271 translates the virtual device address to the privilege information physical address, namely the physical address indicated in the second translation table to correspond to the virtual device address. The virtual device 261 then writes data to the storage area 321 that is identified by the privilege information physical address.

On the other hand, when the received information selection signal indicates an authentication failure, the selection service 271 changes the physical address, which is indicated in the second translation table to correspond to the virtual device address, to the regular information physical address.

Upon receiving from the task 1 252 a data read request with the virtual device address specified, to read data from the virtual device 261, the selection service 271 translates the virtual device address to the regular information physical address, namely the physical address indicated in the second translation table to correspond to the virtual device address. The virtual device 261 then reads the regular information 233 from the storage area 322 that is identified by the regular information physical address, and passes the regular information 233 to the task 1 252.

Also, upon receiving from the task 1 252 a data write request with the virtual device address specified, to write data to the virtual device 261, the selection service 271 translates the virtual device address to the regular information physical address, namely the physical address indicated in the second translation table to correspond to the virtual device address. The virtual device 261 then writes data to the storage area 322 that is identified by the regular information physical address.

As described above, with the virtual device provision function, when the virtual device 261 is requested to access a storage area by the second virtual machine 202, the hypervisor 203 allows the virtual device 261 to access the privilege information only when the authentication of the first virtual machine 201 has resulted in success.

1.3. Operation

1.3.1. Operation of Authentication Service Process

The following describes an authentication service process performed by the authentication service 212.

Figure 4:
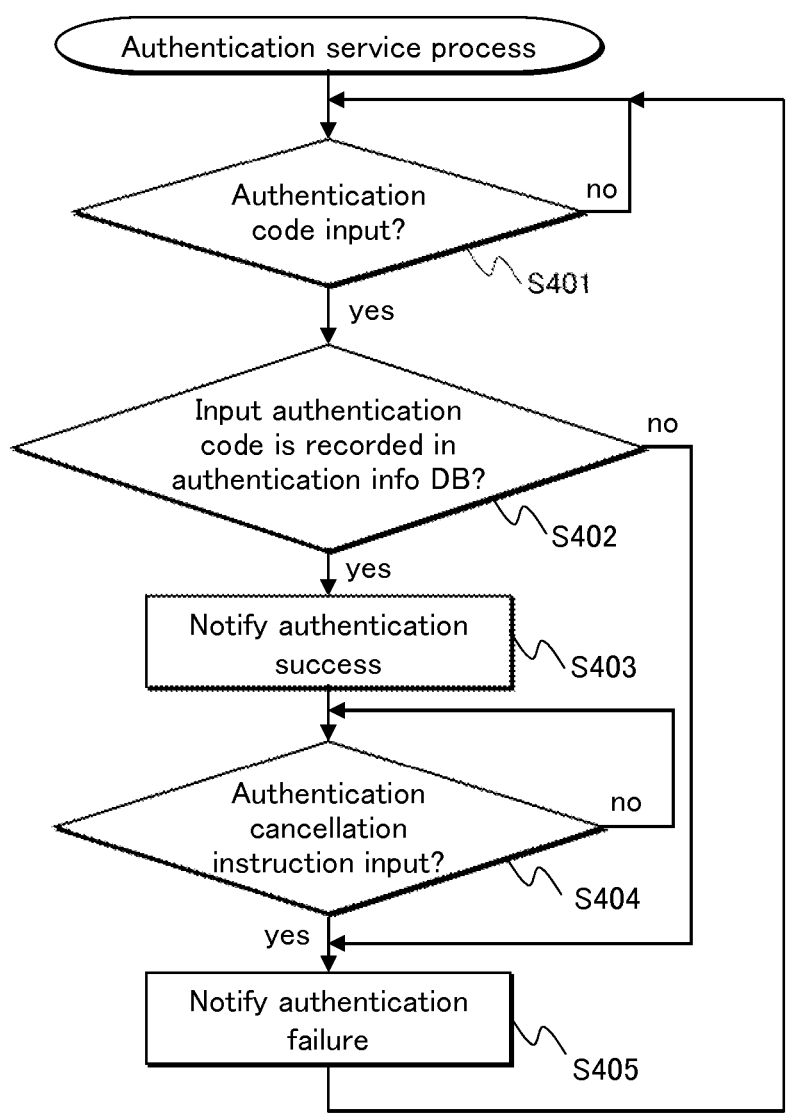
FIG. 4 is a flowchart illustrating one example of the authentication service process in Embodiment 1 of the present invention.

FIG. 4 is a flowchart illustrating the procedure of the authentication service process. First, the authentication service 212 waits for an authentication code to be input (no in step S401). When an authentication code is input (yes in step S401), the authentication service 212 judges whether or not the same authentication code as the input one is recorded in the authentication information DB 231 (step S402). When it judges that the same authentication code is recorded (yes in step S402), it means that the user has input a correct authentication code, the authentication service 212 transmits, as an information selection signal, a signal indicating an authentication success to the selection service 271 of the hypervisor 203 (step S403).

Subsequently, the authentication service 212 waits for an authentication cancellation instruction to be input by the user (no in step S404). When an authentication cancellation instruction is input (yes in step S404), the authentication service 212 transmits, as an information selection signal, a signal indicating an authentication failure to the selection service 271 of the hypervisor 203 (step S405), and the control returns to step S401. When it judges that the same authentication code as the input one is not recorded in the authentication information DB 231 (no in step S402), the control proceeds to step S405.

1.3.2. Mapping Process by Selection Service 271

The following describes a mapping process performed by the selection service 271 of the hypervisor 203.

FIG. 5 is a flowchart illustrating the procedure of the mapping process. First, the selection service 271 generates the first and second translation tables (step S501). Subsequently, the selection service 271 makes the virtual device address in the second translation table correspond to an invalid value as an initial value (step S502).

The selection service 271 then waits for an information selection signal to be received from the authentication service 212 (no in step S503). When it judges that it has received an information selection signal from the authentication service 212 (yes in step S503), the selection service 271 judges whether or not the received information selection signal indicates an authentication success (step S504).

When it judges that the received information selection signal indicates an authentication success (yes in step S504), the selection service 271 makes the virtual device address in the second translation table correspond to the privilege information physical address (step S505). On the other hand, when it judges that the received information selection signal indicates an authentication failure (no in step S504), the selection service 271 makes the virtual device address in the second translation table correspond to the regular information physical address (step S506).

1.3.3. Data Read Process of Virtual Device 261

The following describes, as one example of the process for reading data from the virtual device 261, the data read process performed by a request issued by the task 1 252 that is a general task of the second virtual machine 202.

FIG. 6 is a flowchart illustrating the procedure of the data read process of the virtual device 261. First, the task 1 252 issues a data read request of the virtual device 261, by using the device driver interface of the second OS 251 (step S601).

The second OS 251 issues a data read request with the virtual device address specified, to read data from the virtual device 261.

Upon receiving the data read request of the virtual device 261, the selection service 271 of the hypervisor 203 refers to the second translation table, and when the virtual device address corresponds to the privilege information physical address in the second translation table (yes in step S602), the selection service 271 translates the virtual device address to the privilege information physical address (step S603). On the other hand, when the virtual device address does not correspond to the privilege information physical address in the second translation table, namely, when it corresponds to the regular information physical address (no in step S602), the selection service 271 translates the virtual device address to the regular information physical address (step S604).

The virtual device 261 then reads data from a storage area identified by the physical address after the translation made in step S603 or S604 (step S605). Note that when a translation from a logical address to a physical address has been made in step S603, the data that is read in step S605 is the privilege information. Also, when a translation from a logical address to a physical address has been made in step S604, the data that is read in step S605 is the regular information.

Subsequently, the virtual device 261 passes the read data to the task 1 252.

1.3.4. Data Write Process for Writing Data to Virtual Device 261

The following describes, as one example of the process for writing data to the virtual device 261, the data write process performed by a request issued by the task 1 252 that is a general task of the second virtual machine 202.

FIG. 7 is a flowchart illustrating the procedure of the data write process for writing data to the virtual device 261.

First, the task 1 252 issues a data write request to write data to the virtual device 261, by using the device driver interface of the second OS 251 (step S701).

The second OS 251 issues a data write request with the virtual device address specified, to write data to the virtual device 261.

Upon receiving the data write request to write data to the virtual device 261, the selection service 271 of the hypervisor 203 refers to the second translation table, and when the virtual device address corresponds to the privilege information physical address in the second translation table (yes in step S702), the selection service 271 translates the virtual device address to the privilege information physical address (step S703). On the other hand, when the virtual device address does not correspond to the privilege information physical address in the second translation table, namely, when it corresponds to the regular information physical address (no in step S702), the selection service 271 translates the virtual device address to the regular information physical address (step S704).

The virtual device 261 then writes data to a storage area identified by the physical address after the translation made in step S703 or S704 (step S705).

1.3.5. Screen Display Examples

Figure 8:
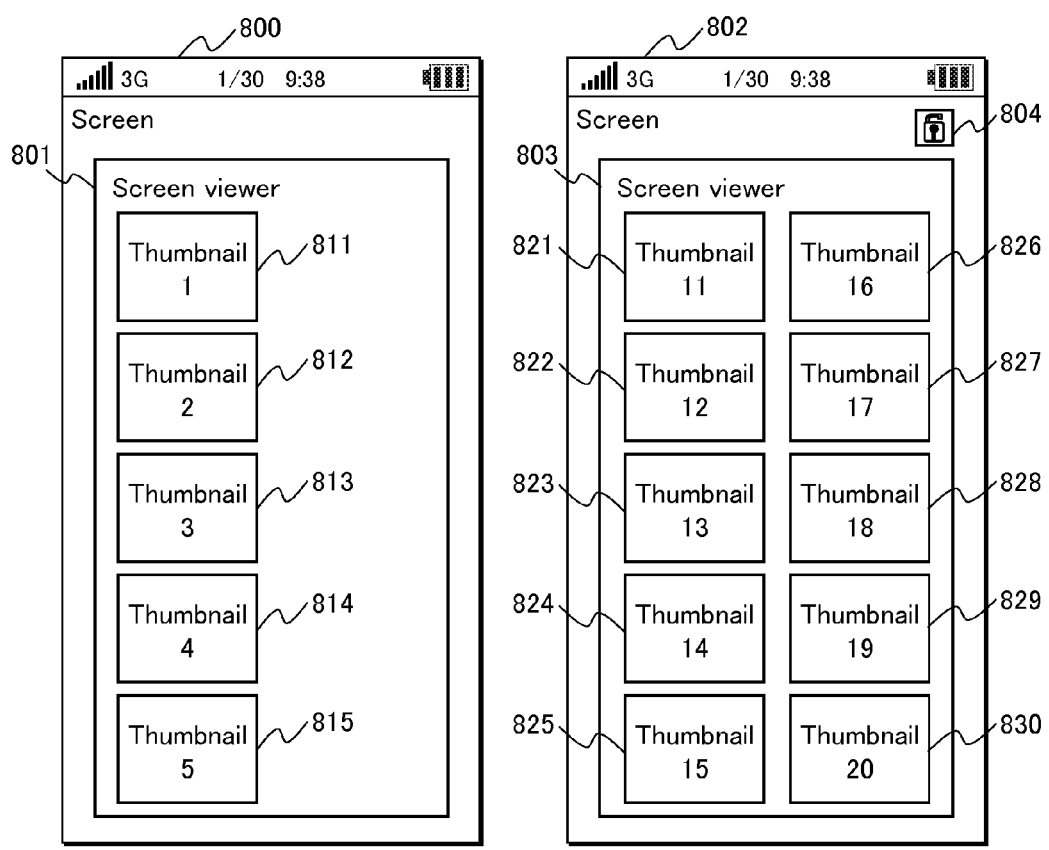
FIG. 8 illustrates one example of screen display in Embodiment 1 of the present invention.

FIG. 8 illustrates examples of the screen displayed in the image display process, which is a process performed by the task 1 252 by using the privilege information 232 and the regular information 233. A screen 800 is one example of the screen displayed on the display unit 206 when the authentication performed by the authentication service 212 has resulted in failure. Also, a screen 802 is one example of the screen displayed on the display unit 206 when the authentication performed by the authentication service 212 has resulted in success.

Here, it is assumed that the task 1 252 is an image viewer that, when activated, displays thumbnail images on the display unit 206.

When the authentication performed by the authentication service 212 has resulted in failure, the task 1 252 cannot read the privilege information 232 from the virtual device 261, and thus reads the regular information 233 instead. In this case, the task 1 252 displays, in an image display area 801 of the screen 800, thumbnails 1 811 to 5 815 that are thumbnail images of five images included in the regular information 233.

On the other hand, when the authentication performed by the authentication service 212 has resulted in success, the task 1 252 reads the privilege information 232 from the virtual device 261. In this case, the task 1 252 displays, in an image display area 803 of the screen 802, thumbnails 11 821 to 20 830 that are thumbnail images of 10 images included in the privilege information 232. Note that, in the present embodiment, when the authentication results in success, the system notifies the user of the authentication success. More specifically, an image 804, which is, for example, an icon or a pictogram representing unlocking that indicates the authentication success, is displayed on the screen 802.

As described above, in the virtual machine system 100, the task 1 252 displays different images depending on whether or not the authentication has resulted in success.

2. Embodiment 2

2.1. Outline

Embodiment 1 describes a case where, when the second virtual machine 202 accesses the virtual device 261, the hypervisor 203 performs a control to allow either the privilege information or the regular information held by the first virtual machine 201 to be accessed, depending on the authentication result of the first virtual machine 201.

In the present embodiment, a virtual email folder is used as the virtual device. Here, an email folder is a folder for storing email-related information such as email body texts and an address book for one email account. When the second virtual machine 902 accesses the virtual email folder, the hypervisor 903 controls which of the first email folder and the second email folder held by the first virtual machine 901 can be accessed by the second virtual machine 902, depending on which of the first user and the second user has been authenticated by the first virtual machine 901, the first email folder storing data concerning emails of the first user, and the second email folder storing data concerning emails of the second user. The following describes the present embodiment centering on the differences from Embodiment 1.

2.2. Structure

The hardware structure of the virtual machine system in the present embodiment is the same as that explained in Embodiment 1 with reference to FIG. 1.

The following describes the functional structure of a virtual machine system 900 in the present embodiment with reference to the accompanying drawings. In the present embodiment, structural elements that are the same as those in Embodiment 1 are assigned the same reference numbers, and the explanation thereof is omitted unless it is required in particular.

Figure 9:
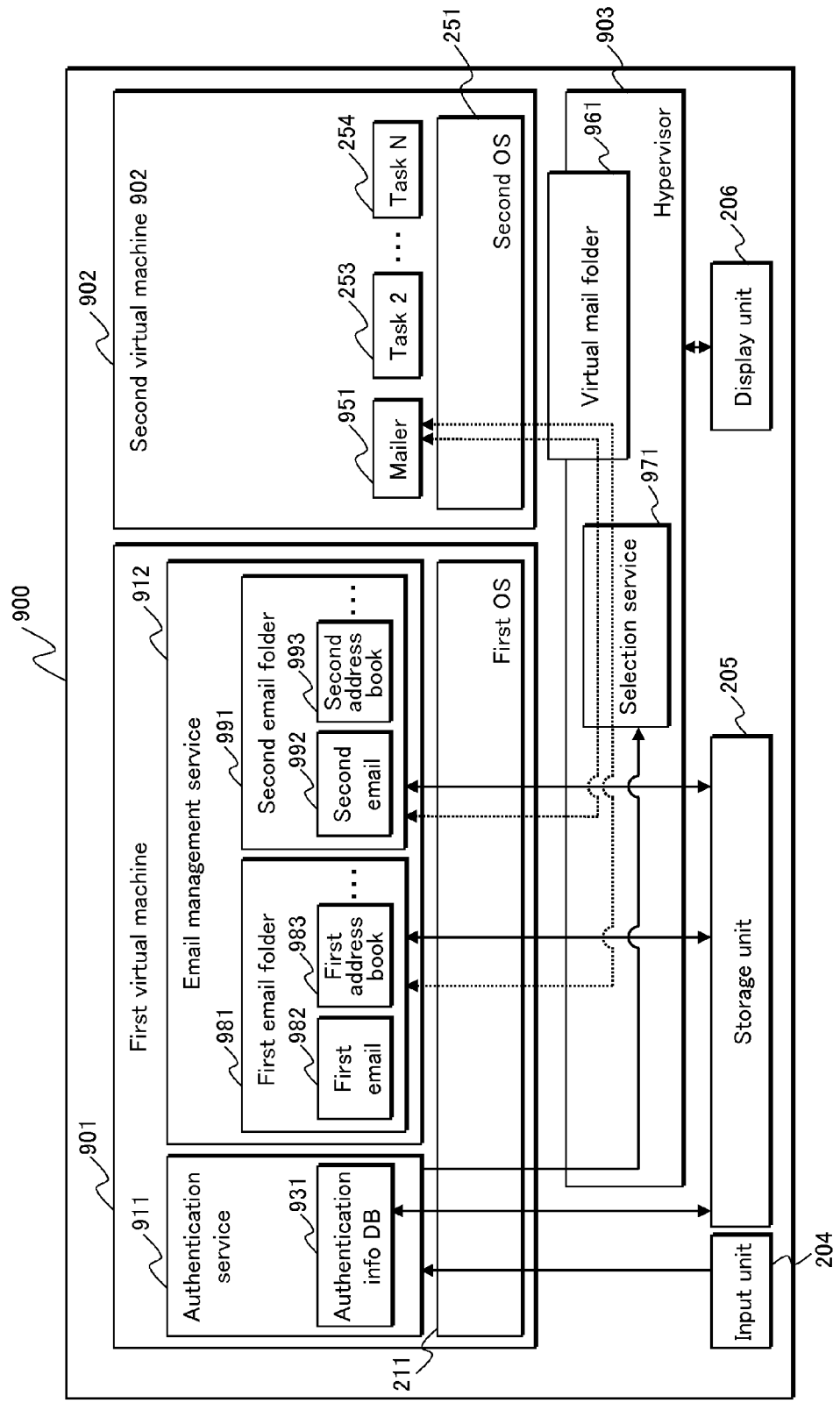
FIG. 9 is a diagram schematically illustrating the functional structure of the virtual machine system in Embodiment 2 of the present invention.

FIG. 9 is a diagram schematically illustrating the functional structure of the virtual machine system 900. As illustrated in FIG. 9, the virtual machine system 900 includes a first virtual machine 901, a second virtual machine 902, a hypervisor 903, the input unit 204, the storage unit 205, and the display unit 206.

First Virtual Machine 901

The first virtual machine 901 differs from the first virtual machine 201 of Embodiment 1 in that an authentication service 911 and an email management service 912 operate as management tasks.

(1) Authentication Service 911

The authentication service 911 differs from the authentication service in Embodiment 1 in that it performs the authentication process by using a user name in addition to the authentication code. The authentication service 911 uses, as the database, an authentication information DB 931 that stores user names and authentication codes unique to the users, with correspondence therebetween. The authentication service 911 obtains, from the input unit 204, a user name and an authentication code that are input by the user. The authentication service 911 then judges whether or not the obtained pair of user name and authentication code are stored in the authentication information DB 931 as a pair of user name and authentication code corresponding to each other, and when it judges that the user name and the authentication code are stored as a pair in the authentication information DB 931, it transmits to the hypervisor 903 an information selection signal that includes (i) signal authentication success/failure information indicating an authentication success and (ii) the user name of the user who has been authenticated successfully. Also, when it judges that the user name and the authentication code are not stored as a pair in the authentication information DB 931, the authentication service 911 transmits to the hypervisor 903 an information selection signal that includes authentication success/failure information indicating an authentication failure.

(2) Email Management Service 912

The email management service 912 has a function to manage the email folder in which email-related data such as email body texts and the address book are recorded. As the management of the email folder, the email management service 912 performs the following process. First, the email management service 912 reads a first email folder 981 and a second email folder 991 from the storage unit 205 and stores them.

The first email folder 981 is a folder storing data concerning emails of a first user. The first email folder 981 stores a first email 982 and a first address book 983, the first email 982 being data representing email body texts, and the first address book 983 storing one or more email addresses used by the first user. The first email 982 is assumed to include eight emails, as one example.

The second email folder 991 is a folder storing data concerning emails of a second user. The second email folder 991 stores a second email 992 and a second address book 993, the second email 992 being data representing email body texts, and the second address book 993 storing one or more email addresses used by the second user. The second email 992 is assumed to include eight emails, as one example.

The email management service 912 also notifies the hypervisor 903 of: a logical address of a storage area holding the first email folder 981 (the logical address is an address in a logical address space managed by the first OS 211. Hereinafter, the logical address is referred to as a "first email folder logical address"); and a logical address of a storage area holding the second email folder 991 (the logical address is an address in a logical address space managed by the first OS 211. Hereinafter, the logical address is referred to as a "second email folder logical address").

Note that hereinafter, a physical address of a storage area storing the first email folder 981 is referred to as a "first email folder physical address". Also, a physical address of a storage area storing the second email folder 991 is referred to as a "second email folder physical address".

Note that it is assumed that the first OS 211 and the hypervisor 903 perform controls such that reading of the first email folder 981 and the second email folder 991 from the storage unit 205 and writing of the first email folder 981 and the second email folder 991 to the storage unit 205 can be performed only by the email management service 912.

Second Virtual Machine 902

The second virtual machine 902 differs from the second virtual machine 202 of Embodiment 1 in that, in place of the task 1 252, a mailer 951 operates as a general task. Furthermore, in the present embodiment, a virtual email folder address is used, wherein the virtual email folder address is a predetermined logical address used by the virtual device interface to access the virtual email folder.

The mailer 951 is an application program that executes email-related processes such as creation, display, and transmission/reception of an email (hereinafter the processes are referred to as "email processes"). The mailer 951, to perform an email process, accesses an email folder storing: email data including email body texts; and an address book storing email addresses used by the user.

It should be noted here that the mailer 951 recognizes in advance that, to access the email folder, it only needs to access the virtual email folder, and thus the mailer 951 accesses the virtual email folder when it performs the email process. Furthermore, the mailer 951 accesses the email data and the address book and the like by using the virtual email folder, and performs an email process such as displaying on the display unit 206 an email body text included in the email data or the contents of the address book.

Note that, in the present embodiment, the email folder is assumed to have a data structure conforming to a predetermined format. It is also assumed that it is possible to recognize the data size of the email data and the address book included in the email folder, and the number of pieces of data included therein, by referring to data stored in a predetermined location of the data structure (hereinafter the data stored in the predetermined location is referred to as "folder management information"). It is also assumed that the email data included in the email folder also has a data structure conforming to a predetermined format, and that information, which is used to extract the emails from the email data, is stored in a predetermined location of the data structure (hereinafter the information is referred to as "email management information"), the email management information indicating the number of emails included in the email data, the recording position of each email in the email data and the like.

Hypervisor 903

The hypervisor 903 is different from the hypervisor 203 of Embodiment 1 in that it has a virtual email folder provision function instead of the virtual device provision function. The hypervisor 903 also includes a selection service 971 that realizes the virtual email folder provision function.

Virtual Email Folder Provision Function

Figure 13:
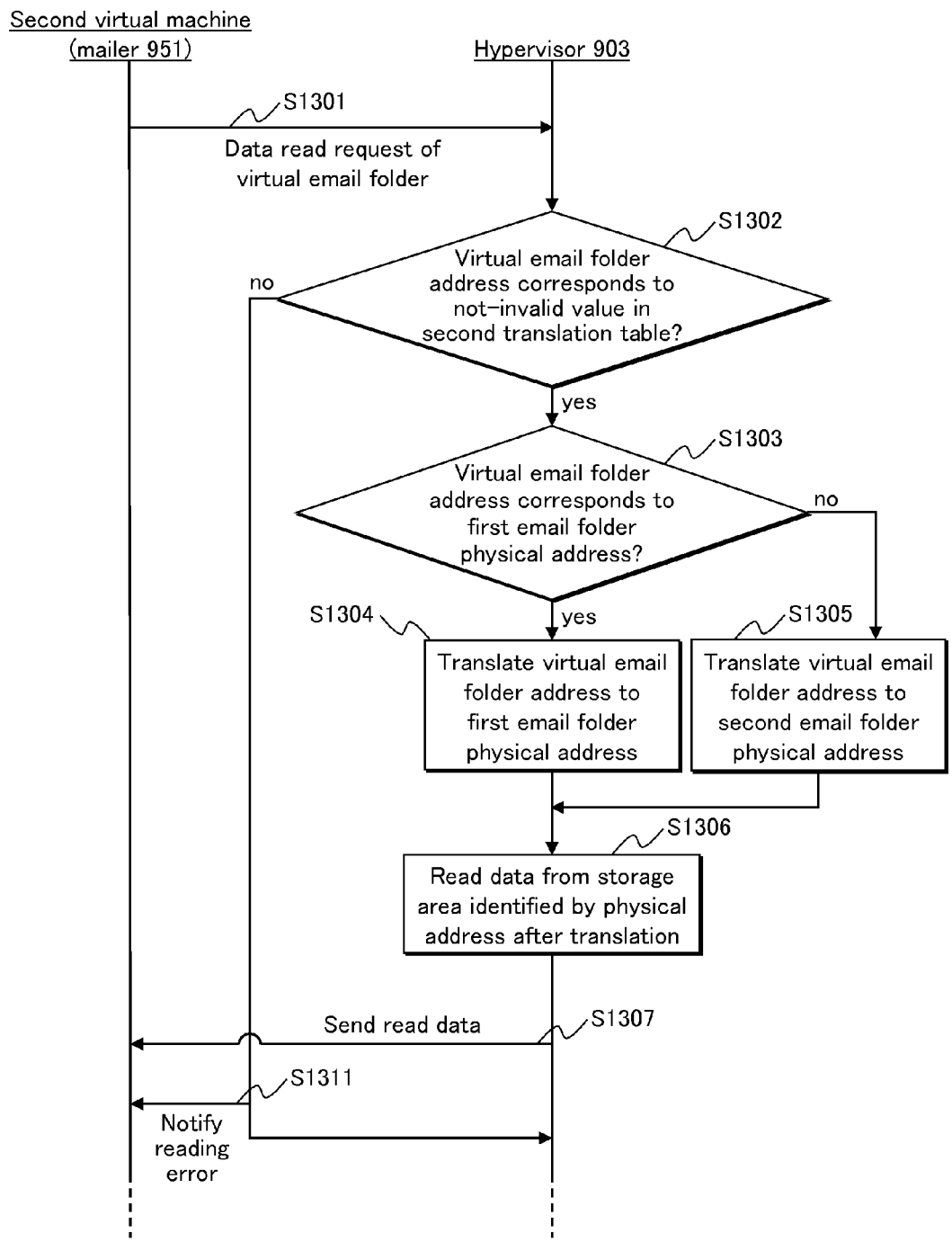
FIG. 13 is a flowchart illustrating one example of the data read process for reading data from the virtual email folder in Embodiment 2 of the present invention.
Figure 14:
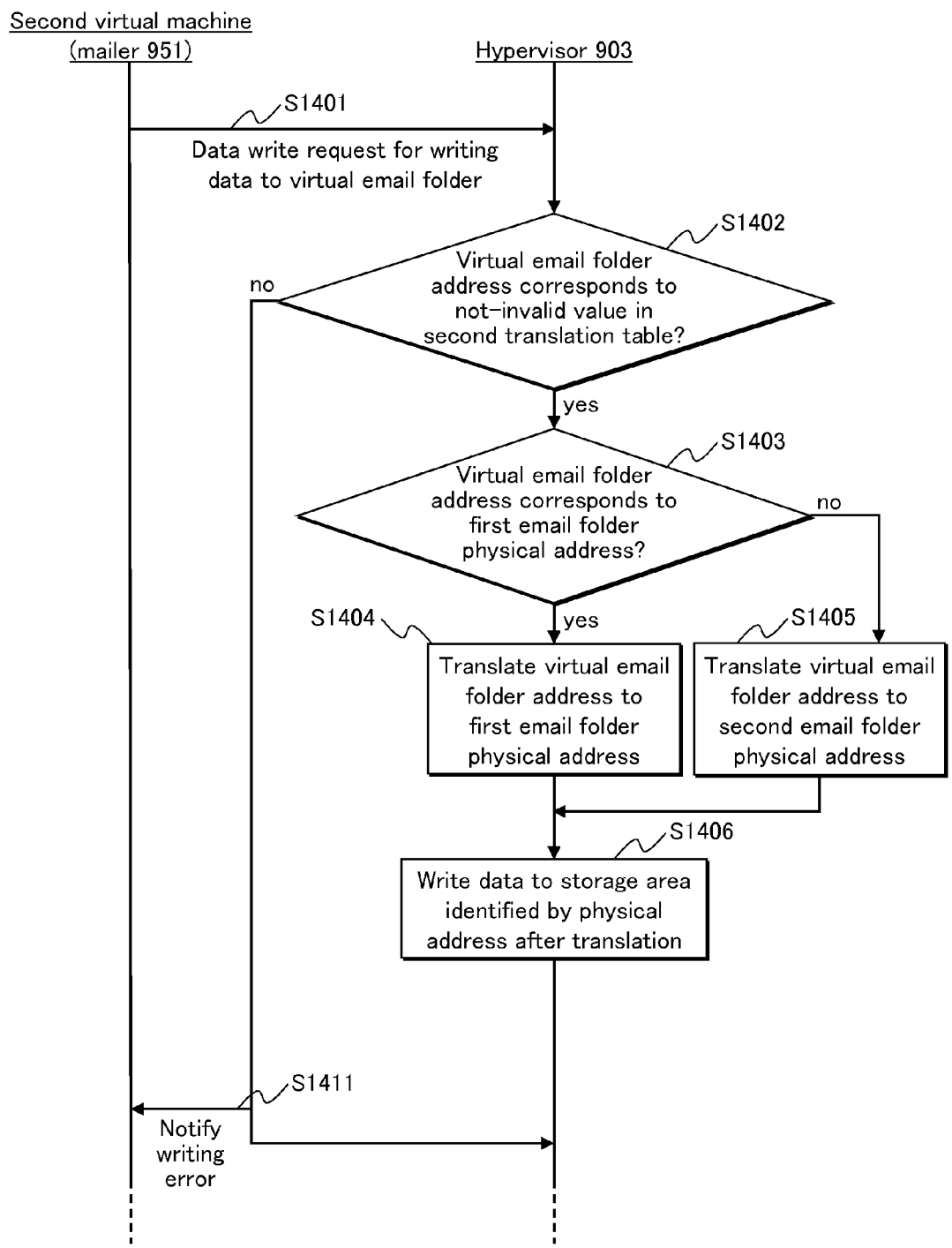
FIG. 14 is a flowchart illustrating one example of the data write process for writing data to the virtual email folder in Embodiment 2 of the present invention.

The virtual email folder provision function is a function to perform a control such that, only when the authentication performed by the authentication service 911 of the first virtual machine 901 results in success, the mailer 951, which is a general task of the second virtual machine 902, is allowed to access the first email folder 981 or the second email folder 991 stored in the first virtual machine 901 by using the virtual email folder (see FIGS. 13 and 14).

The virtual email folder provision function is realized as follows. That is to say, the selection service 971 describes, in the second translation table, a virtual email folder address and a physical address with correspondence therebetween. The selection service 971, upon receiving an information selection signal from the authentication service 911, changes the physical address that corresponds to the virtual email folder address in the second translation table, in accordance with the content of the received information selection signal.

When the authentication success/failure information included in the received information selection signal indicates an authentication success and the user name included in the information selection signal indicates the user name of the first user, the selection service 971, in the second translation table, makes the virtual email folder address correspond to the first email folder physical address. When the user name included in the information selection signal indicates the user name of the second user, the selection service 971, in the second translation table, makes the virtual email folder address correspond to the second email folder physical address.

When the authentication success/failure information included in the information selection signal indicates an authentication failure, the selection service 971, in the second translation table, makes the virtual email folder address correspond to an invalid value (for example, 0xFFFFFFFF) that is defined in advance as a value indicating an invalid address in the virtual machine system 900. Note that, when the second translation table is generated, the selection service 971 makes the virtual email folder address correspond to an invalid value as an initial value.

Upon receiving a data read request with the virtual email folder address specified from the mailer 951, the hypervisor 903 refers to the second translation table and translates the virtual email folder address to a corresponding physical address that is indicated in the second translation table. The hypervisor 903 then reads data from a storage area that is identified by the physical address after the translation, and passes the data to the mailer 951.

Upon receiving a data write request with the virtual email folder address specified from the mailer 951, the hypervisor 903 refers to the second translation table and translates the virtual email folder address to a corresponding physical address that is indicated in the second translation table. The hypervisor 903 then writes data to a storage area identified by the physical address after the translation.

Note that when the hypervisor 903 receives a data access request with the virtual email folder address specified from the mailer 951 and finds, by referring to the second translation table, that the specified email folder address corresponds to an invalid value, the hypervisor 903 notifies the mailer 951 of an access error.

Mapping

Figure 10:
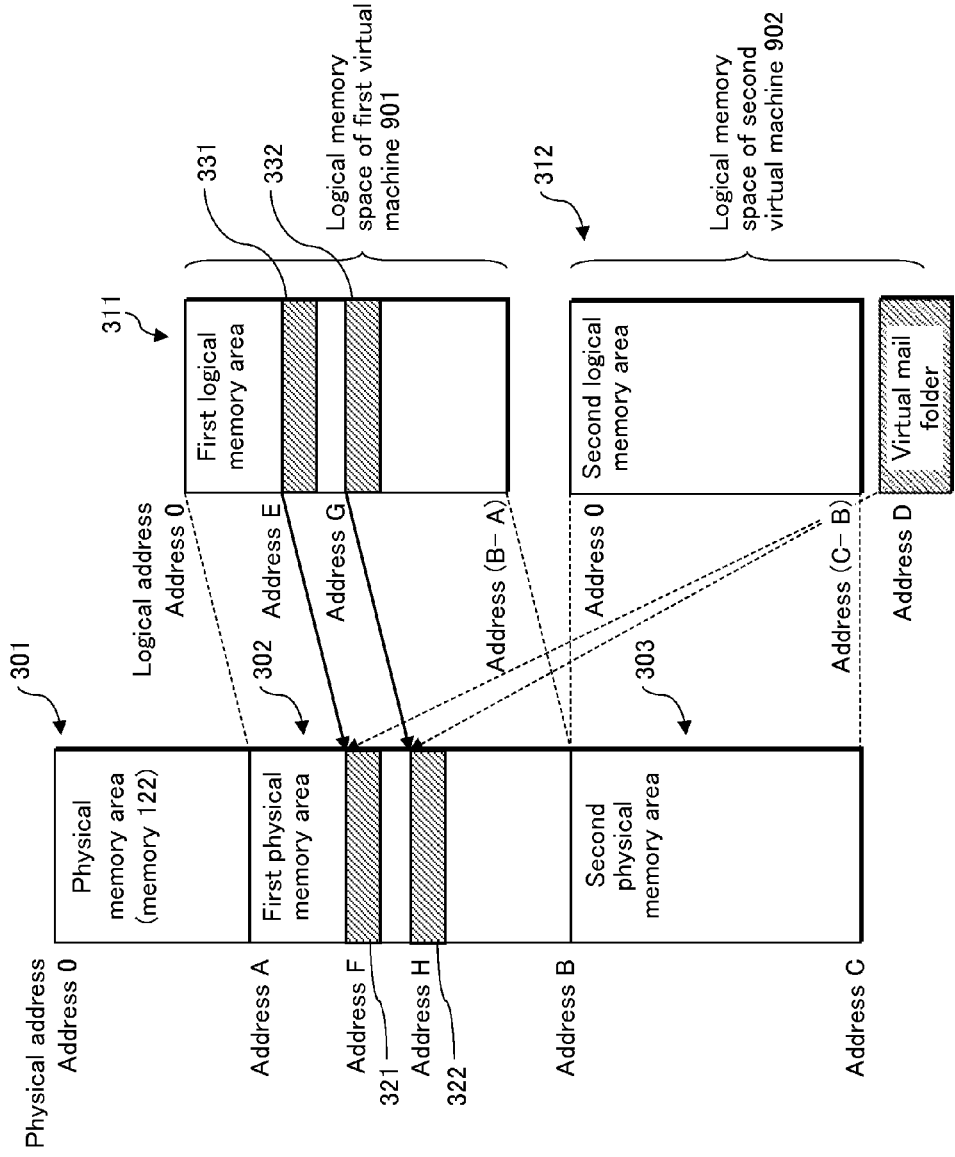
FIG. 10 is a diagram schematically illustrating the mapping in Embodiment 2 of the present invention.

Here, the mapping of the present embodiment is described with reference to FIG. 10. In the present embodiment, it is assumed as one example that the first email folder 981 is stored in the storage area 321 at physical address F, and the second email folder 991 is stored in the storage area 322 at physical address H. Thus the first email folder physical address is address F, and the first email folder logical address is address E. Also, the second email folder physical address is address H, and the second email folder logical address is address G.

Furthermore, the virtual email folder address is address D. When the selection service 971 receives an information selection signal, and the authentication success/failure information included in the received information selection signal indicates an authentication success and the user name indicates the user name of the first user, the selection service 971, in the second translation table, makes the virtual email folder address correspond to the address F that is the first email folder physical address. Also, when the authentication success/failure information included in the received information selection signal indicates an authentication success and the user name indicates the user name of the second user, the selection service 971, in the second translation table, makes the virtual email folder address correspond to the address H that is the second email folder physical address.

2.3. Operation 2.3.1. Operation in Authentication Service Process

The following describes an authentication service process performed by the authentication service 911.

Figure 11:
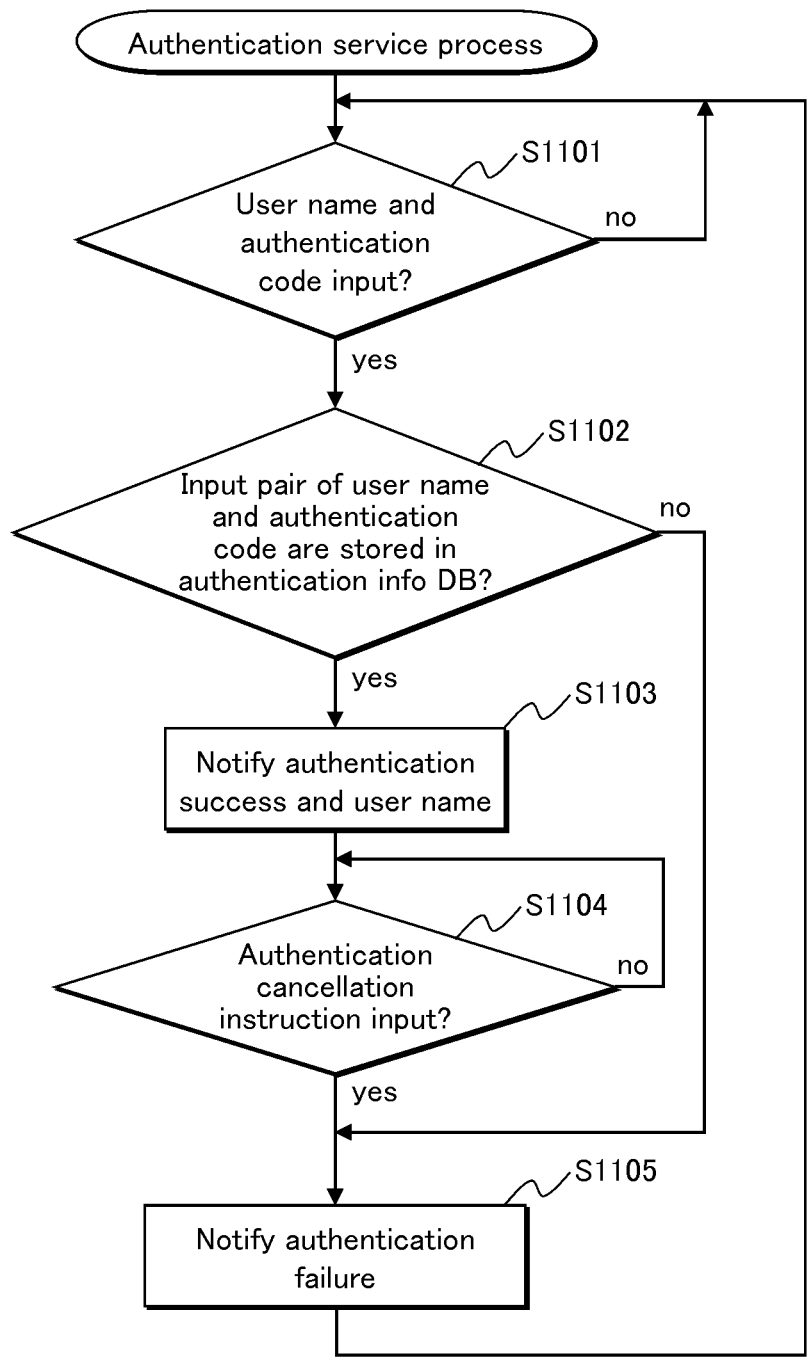
FIG. 11 is a flowchart illustrating one example of the authentication service process in Embodiment 2 of the present invention.

FIG. 11 is a flowchart illustrating the procedure of the authentication service process. First, the authentication service 911 waits for a user name and an authentication code to be input (no in step S1101). When a user name and an authentication code are input (yes in step S1101), the authentication service 911 judges whether or not the input pair of user name and authentication code are stored in the authentication information DB 931 as a pair of user name and authentication code that correspond to each other (step S1102). When it judges that the user name and the authentication code are stored as a pair in the authentication information DB 931 (yes in step S1102), it means that the user has input correct user name and authentication code, the authentication service 911 transmits an information selection signal that includes (i) authentication success/failure information indicating an authentication success and (ii) the user name to the selection service 971 of the hypervisor 903 (step S1103).

Subsequently, the authentication service 911 waits for an authentication cancellation instruction to be input by the user (no in step S1104). When the authentication cancellation instruction is input (yes in step S1104), the authentication service 911 transmits an information selection signal including authentication success/failure information indicating an authentication failure to the selection service 971 (step S1105), and the control returns to step S1101. When it is judged in step S1102 that the user name and the authentication code are not stored as a pair in the authentication information DB 931 (no in step S1102), the control proceeds to step S1105.

2.3.2. Mapping Process Performed by Selection Service 971

The following describes a mapping process performed by the selection service 971 of the hypervisor 903.

Figure 12:
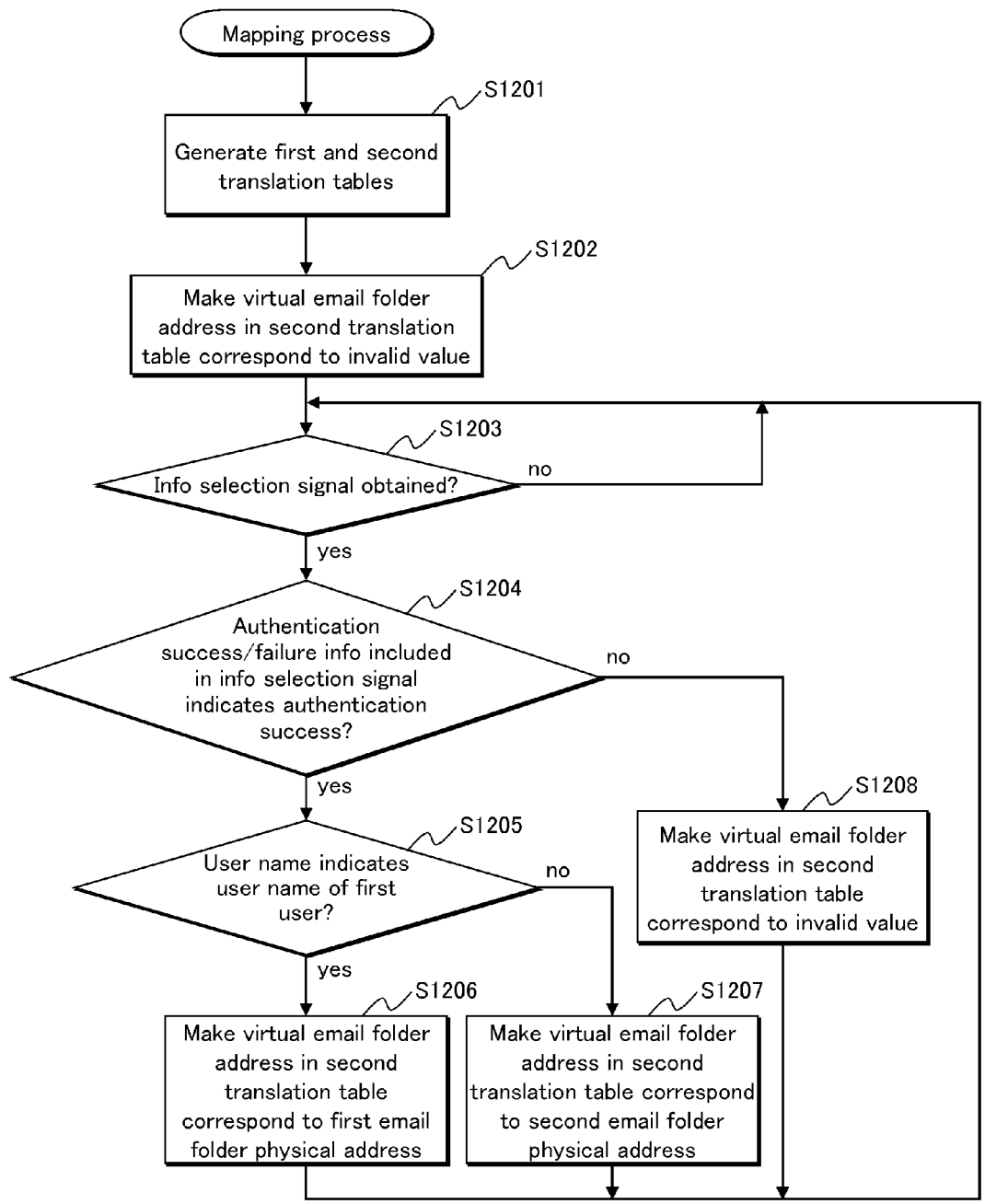
FIG. 12 is a flowchart illustrating one example of the mapping process in Embodiment 2 of the present invention.

FIG. 12 is a flowchart illustrating the procedure of the mapping process. First, the selection service 971 generates the first and second translation tables (step S1201). Subsequently, the selection service 971, in the second translation table, makes the virtual email folder address correspond to an invalid value as an initial value (step S1202).

The selection service 971 then waits for an information selection signal to be received from the authentication service 911 (no in step S1203). When it judges that it has received an information selection signal from the authentication service 911 (yes in step S1203), the selection service 971 judges whether or not the authentication success/failure information included in the received information selection signal indicates an authentication success (step S1204).

When it judges that the authentication success/failure information indicates an authentication success (yes in step S1204), the selection service 971 judges whether or not the user name included in the received information selection signal indicates the user name of the first user (step S1205). When it judges that the user name included in the received information selection signal indicates the user name of the first user (yes in step S1205), the selection service 971, in the second translation table, makes the virtual email folder address correspond to the first email folder physical address (step S1206), and the control returns to step S1203. On the other hand, when it judges that the user name included in the received information selection signal indicates the user name of the second user (no in step S1205), the selection service 971, in the second translation table, makes the virtual email folder address correspond to the second email folder physical address (step S1207), and the control returns to step S1203.

Also, when it judges that the authentication success/failure information included in the received information selection signal indicates an authentication failure (no in step S1204), the selection service 971, in the second translation table, makes the virtual email folder address correspond to an invalid address (step S1208), and the control returns to step S1203.

2.3.3. Data Read Process for Reading Data from Virtual Email Folder

The following describes, as one example of the data read process for reading data from the virtual email folder, the data read process by the mailer 951 that is a general task of the second virtual machine 902.

FIG. 13 is a flowchart illustrating the procedure of the data read process for reading data from the virtual email folder. First, the mailer 951 issues a data read request of the virtual email folder, by using the file system interface of the second OS 251 (step S1301).

The second OS 251 issues a data read request with the virtual email folder address specified, to read data from the virtual email folder 961.

Upon receiving the data read request of the virtual email folder, the selection service 971 of the hypervisor 903 refers to the second translation table and judges whether or not the virtual email folder address corresponds to a not-invalid value in the second translation table (step S1302).

When it judges that the virtual email folder address corresponds to a not-invalid value in the second translation table (yes in step S1302) and that the virtual email folder address corresponds to the first email folder physical address in the second translation table (yes in step S1303), the hypervisor 903 translates the specified virtual email folder address to the first email folder physical address (step S1304), and the control proceeds to step S1306. On the other hand, when it judges that the virtual email folder address does not correspond to the first email folder physical address in the second translation table, namely, the virtual email folder address corresponds to the second email folder physical address in the second translation table (no in step S1303), the hypervisor 903 translates the specified virtual email folder address to the second email folder physical address (step S1305), and the control proceeds to step S1306.

The virtual email folder 961 then reads data from a storage area identified by the physical address after the translation made in step S1304 or S1305 (step S1306). Subsequently, the virtual email folder 961 passes the read data to the mailer 951 (step S1307). Note that the data read in step S1306 is data representing the content of the first email folder 981 when the address translation has been made in step S1304. Also, the data read in step S1306 is data representing the content of the second email folder 991 when the address translation has been made in step S1305.

Note that when it judges that the virtual email folder address corresponds to an invalid value in the second translation table (no in step S1302), the hypervisor 903 notifies the mailer 951 of a reading error (step S1311).

2.3.4. Data Write Process for Writing Data to Virtual Email Folder

The following describes, as one example of the data write process for writing data to the virtual email folder, a data write process for writing data to the virtual email folder performed by the mailer 951 that is a general task of the second virtual machine 902.

FIG. 14 is a flowchart illustrating the procedure of the data write process for writing data to the virtual email folder.

First, the mailer 951 issues a data write request for writing data to the virtual email folder, by using the file system interface of the second OS 251 (step S1401). The second OS 251 issues a data write request with the virtual email folder address specified, to write data to the virtual email folder 961. Upon receiving the data write request for writing data to the virtual email folder, the selection service 971 of the hypervisor 903 refers to the second translation table and judges whether or not the virtual email folder address corresponds to a not-invalid value in the second translation table (step S1402).

When it judges that the virtual email folder address corresponds to a not-invalid value in the second translation table (yes in step S1402) and that the virtual email folder address corresponds to the first email folder physical address in the second translation table (yes in step S1403), the hypervisor 903 translates the specified virtual email folder address to the first email folder physical address (step S1404), and the control proceeds to step S1406. On the other hand, when it judges that the virtual email folder address does not correspond to the first email folder physical address in the second translation table, namely, the virtual email folder address corresponds to the second email folder physical address in the second translation table (no in step S1403), the hypervisor 903 translates the specified virtual email folder address to the second email folder physical address (step S1405), and the control proceeds to step S1406.

The virtual email folder 961 then writes data, which has been specified by the mailer 951, to a storage area identified by the physical address after the translation made in step S1404 or S1405 (step S1406).

Note that the storage area to which the data is written in step S1406 is a storage area storing the first email folder 981, when the address translation has been made in step S1404. Accordingly, in step S1406, the content of the first email folder 981 is changed or the like.

Also, the storage area to which the data is written in step S1406 is a storage area storing the second email folder 991, when the address translation has been made in step S1405. Accordingly, in step S1406, the content of the second email folder 991 is changed or the like.

Note that when it judges that the virtual email folder address corresponds to an invalid value in the second translation table (no in step S1402), the hypervisor 903 notifies the mailer 951 of a writing error (step S1411).

As described above, the virtual machine system 900 can change or hide from view the email folder used by the mailer 951, without being recognized by the mailer 951 of the second virtual machine, in accordance with whether the authentication performed in the first virtual machine 901 has resulted in success or failure, and what user has been authenticated successfully.

2.3.5. Screen Display Examples

Figure 15:
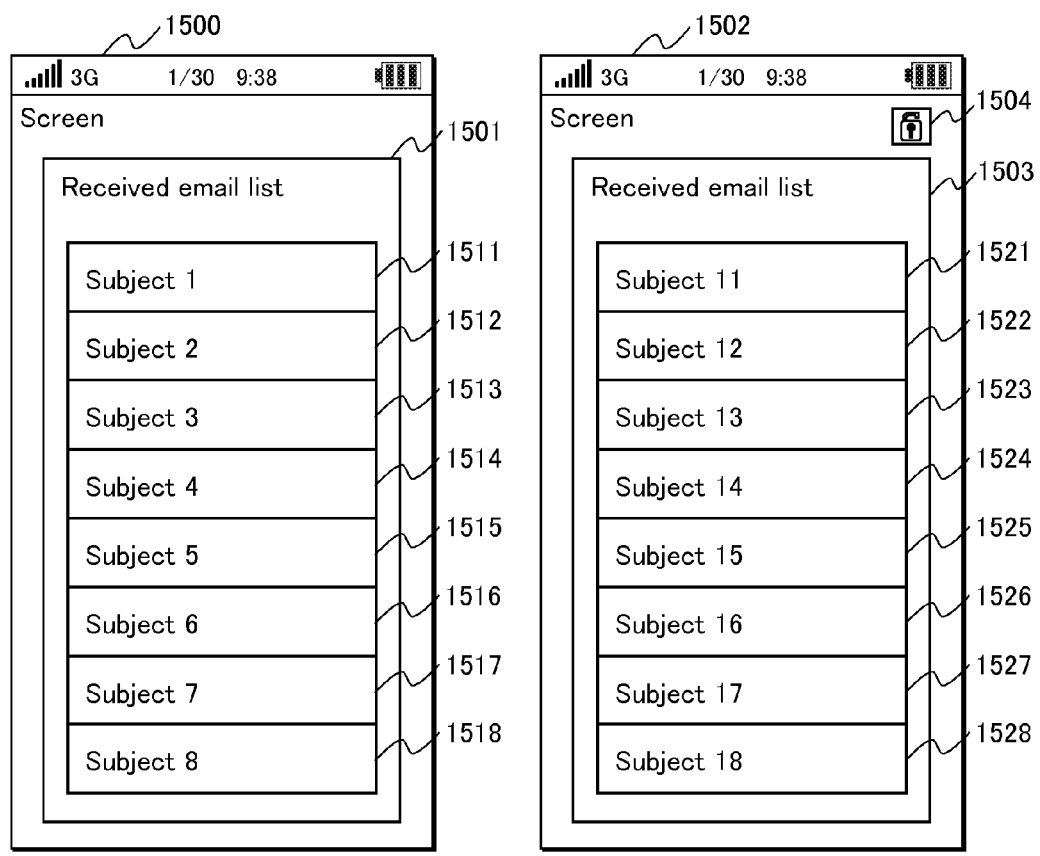
FIG. 15 illustrates one example of screen display in Embodiment 2 of the present invention.

FIG. 15 illustrates examples of the screen displayed in the email display process, which is an example of the process that is performed by the mailer 951 by using the first and second email folders. A screen 1500 is one example of the screen displayed on the display unit 206 when the authentication performed by the authentication service 911 has resulted in failure. Also, a screen 1502 is one example of the screen displayed on the display unit 206 when the authentication performed by the authentication service 911 has resulted in success.

It is assumed here as a premise that, when activated, the mailer 951 analyzes the email header of the emails included in the first mail 982 or the second mail 992 in the first email folder 981 or the second email folder 991, and displays a list of subjects.

Premised on the above, when the authentication by the authentication service 911 has resulted in success and the user is the second user, the mailer 951 can read only contents of the second email folder 991, but not contents of the first email folder 981, by accessing the virtual email folder. In this case, the mailer 951 displays, in an email display area 1501 of the screen 1500, subjects 1 1511 to 8 1518 of eight emails included in the second mail 992.

Also, when the authentication by the authentication service 911 has resulted in success and the user is the first user, the mailer 951 read contents of the first email folder 981 by accessing the virtual email folder 961. In this case, the mailer 951 displays, in an email display area 1503 of the screen 1502, subjects 11 1521 to 18 1528 of eight emails included in the first email 982.

Note that, in the present embodiment, when the authentication results in success, the system notifies the user of the authentication success. More specifically, an image 1504, which is, for example, an icon or a pictogram representing unlocking that indicates the authentication success, is displayed on the screen 1502.

3. Modifications

Up to now, embodiments of the virtual machine system of the present invention have been described. However, the present invention is not limited to the virtual machine systems described in the above embodiments, but may be modified as follows.

(1) In Embodiment 1, when the authentication by the authentication service 212 results in success, the virtual device 261 is mapped with a physical address of a storage area storing the privilege information 232. Also, when the authentication results in failure, the virtual device 261 is mapped with a physical address of a storage area storing the regular information 233.

However, the virtual device need not necessarily be mapped with one of two types of information to allow an access thereto in accordance with whether the authentication has resulted in success or failure, but it is sufficient to control whether or not to permit use of information that needs to be confidential (for example, the privilege information 232) in accordance with whether the authentication has resulted in success or failure.

For example, as the mapping function, the selection service 271 may, in the second translation table, make the virtual device address correspond to the privilege information physical address when the information selection signal indicates an authentication success, and make the virtual device address correspond to the above-described invalid value when the information selection signal indicates an authentication failure. With this arrangement, when the authentication results in success, the second virtual machine 202 can access the privilege information 232, and when the authentication results in failure, the second virtual machine 202 cannot access the privilege information 232.

Also, the regular information 233 need not be managed by the first virtual machine 201 side, but may be managed by the second virtual machine 202 side so that the regular information 233 can always be referred to by the task 1 252 or the like that operates on the second virtual machine 202.

(2) In Embodiment 2, two accounts are used respectively for the first user and the second user. However, not limited to this, three or more accounts may be used.

Alternatively, only one account (for example, an account for the first user) may be used. In this case, when the authentication by the authentication service 911 has resulted in success, the selection service 971, in the second translation table, makes the virtual email folder address correspond to the first email folder physical address. Also, when the authentication by the authentication service 911 has resulted in failure, the selection service 971, in the second translation table, makes the virtual email folder address correspond to the invalid value.

Subsequently, when the mailer 951 requests to access the virtual email folder and the authentication has resulted in success, the hypervisor 903 refers to the second translation table and translates the virtual email folder address to the first email folder physical address. The hypervisor 903 then accesses a storage area identified by the first email folder physical address.

On the other hand, when the authentication has resulted in failure, the hypervisor 903 refers to the second translation table and recognizes that the physical address corresponding to the virtual email folder address is an invalid value. In this case, the hypervisor 903 cannot access the storage area identified by the first email folder physical address, and notifies the mailer 951 of an access error.

(3) In Embodiment 2, a control is performed such that, when the authentication by the authentication service 911 results in failure, the virtual email folder address is made to correspond to an invalid value in the second translation table, so that the mailer 951 cannot access either the first email folder 981 or the second email folder 991 via the virtual email folder.

However, there is no need to perform a control so that no email folder can be accessed via the virtual email folder when the authentication by the authentication service 911 results in failure. For example, an email folder for a default user (hereinafter the email folder is referred to as a "third email folder") may be prepared in advance, and when the authentication by the authentication service 911 results in failure, an access to the third email folder via the virtual email folder may be allowed. In this case, upon obtaining the authentication success/failure information indicating an authentication failure from the authentication service 911, the selection service 971, in the second translation table, makes the virtual email folder address correspond to a logical address of a location storing the third email folder.

(4) In Embodiments 1 and 2, the authentication is performed by using an authentication code (for example, a password), or by using a user name and the authentication code. However, the present invention is not limited to this structure as far as an authentication of the user is performed. For example, the authentication may be performed by using any well-known technology such as the ID (IDentity) card or biological information (e.g., fingerprint or voiceprint).

(5) Embodiments 1 and 2 may be combined to realize a control where an access to either the privilege information 232 or the regular information 233 is allowed in accordance with whether the authentication by the authentication service results in success or failure, and when the authentication results in success, an access to either the first email folder 981 or the second email folder 991 is allowed in accordance with the user name.

(6) In Embodiments 1 and 2, all functions of the authentication services 212 and 911 are provided on the first virtual machine (201, 901) side. However, a part of these functions may be provided on the second virtual machine (202, 902) side as far as it does not affect the level of security.

For example, among the authentication functions, a user interface may be provided in the second virtual machine 202 and the second virtual machine 902, the user interface being used by the user to input a password, ID card, fingerprint, voiceprint or the like as an authentication code, and the data input by the user may be sent to the first virtual machine 201 and the first virtual machine 901, respectively. In this case, when the user, program vendor or the like is allowed to change programs on the second virtual machines 202 and 902, the user, program vendor or the like can change the user interface as desired. This will eventually result in an improvement in the user friendliness.

(7) In Embodiments 1 and 2, the first OS 211 and the second OS 251 are OSs of different types. However, the first OS 211 and the second OS 251 may be OSs of the same type. It should be noted also that the number of virtual machines, OSs, tasks or the like described in Embodiments 1 and 2 are merely examples, and the present invention is not limited to these.

(8) In Embodiments 1 and 2, the virtual devices are emulated by software. However, the virtual devices may be realized by using hardware such as the MMU (Memory Management Unit).

(9) In Embodiments 1 and 2, the authentication cancellation instruction received by the authentication services 212 and 911 is input by the user. However, it suffices that the authentication success state can be cancelled at an appropriate timing. For example, in the case of Embodiment 1, the authentication may be cancelled when the execution of the task 1 252 ends. More specifically, the authentication service 212, upon detection of the end of the execution of the task 1 252, may transmit the authentication cancellation instruction to the selection service 271. Also, similarly, in the case of Embodiment 2, the authentication service 911, upon detection of the end of the execution of the mailer 951, may transmit the authentication cancellation instruction to the selection service 271.

(10) In Embodiment 1, the information selection signal sent from the authentication service 212 to the selection service 271 indicates either of the two states: authentication success; or authentication failure. However, the information selection signal may indicate one of three or more states.

For example, the information selection signal may indicate one of three states which include a power saving state in addition to the authentication success and failure states described in Embodiment 1. In this case, the selection service 271 judges which of the authentication success state, authentication failure state, and power saving state the information selection signal indicates. The selection service 271 then, in the second translation table, makes the virtual device address correspond to any of: a physical address of a storage area storing the privilege information 232; the regular information 233; and information that is to be used in the power-saving state, in accordance with which state is indicated by the information selection signal.

(11) In Embodiment 1, the hypervisor 203 includes the selection service 271 and provides the virtual device provision function. However, all or part of the virtual device provision function may be realized by the first virtual machine 201. For example, as a part of the virtual device provision function, the first virtual machine 201 may create the second translation table. Furthermore, the hypervisor 203 and the first virtual machine 201 may be integrated and implemented in one program.

(12) In Embodiments 1 and 2, when allocating memory to the first virtual machine (201, 901) and the second virtual machine (202, 902), the hypervisor (203, 903) allocates fixed areas of a predetermined size of the physical memory area. However, the hypervisor may allocate memory by a well-known virtual storage method.

(13) In Embodiments 1 and 2, in execution of the virtual device provision function or the virtual email folder provision function, upon receiving an access request to access the virtual device (virtual email folder) from the second virtual machine (202, 902), the hypervisor (203, 903) allows the second virtual machine (202, 902) to access in units of data sequences or folders of a predetermined number of bytes, such as the privilege information 232, regular information 233, first email folder 981, or second email folder 991. However, not limited to this, the access may be performed in any units. For example, the access may be performed in units of data sequences of a predetermined number of bytes, in units of files, or in units of partitions.

For example, in Embodiment 1, in execution of the virtual device provision function, upon receiving an access request to access the virtual device from the second virtual machine 202, the hypervisor 203 allows the second virtual machine 202 to access, in the actuality, the privilege information 232 managed by the first virtual machine 201. That is to say, the second virtual machine 202 accesses in units of data sequences of a predetermined data length, which is, in this case, the privilege information 232.

When making the virtual device address correspond to the privilege information 232, the hypervisor 203 (selection service 271) makes the virtual device address (for example, the address D) correspond to the privilege information physical address (for example, the address F), as explained in Embodiment 1 with reference to FIG. 3. Here, as one example, the hypervisor 203 may describe the second translation table such that all physical addresses assigned to the storage areas storing the privilege information 232 can be accessed with use of the virtual device address.

For example, the hypervisor 203 may make logical address (D+1) correspond to physical address (F+1), and logical address (D+10) to physical address (F+10). In this case, when the task 1 252 issues an access request to access the virtual device, requesting to read data from address (D+10), the hypervisor 203 translates the address (D+10) to the address (F+10) by using the second translation table. The hypervisor 203 then reads data from a storage area located at the physical address (F+10) in the memory 122, and passes the read data to the task 1 252. Similarly, when the task 1 252 issues an access request to access the virtual device, requesting to write data, the hypervisor translates the logical address to a physical address.

(14) In Embodiment 1, there is no mentioning of encrypting the authentication information DB 231 or the privilege information 232, although the authentication code might be exposed if the authentication information DB 231 is read in an unauthorized manner, and the privilege information 232 is one example of confidential information. However, these pieces of information may be protected by using encryption technologies in combination.

Figure 16:
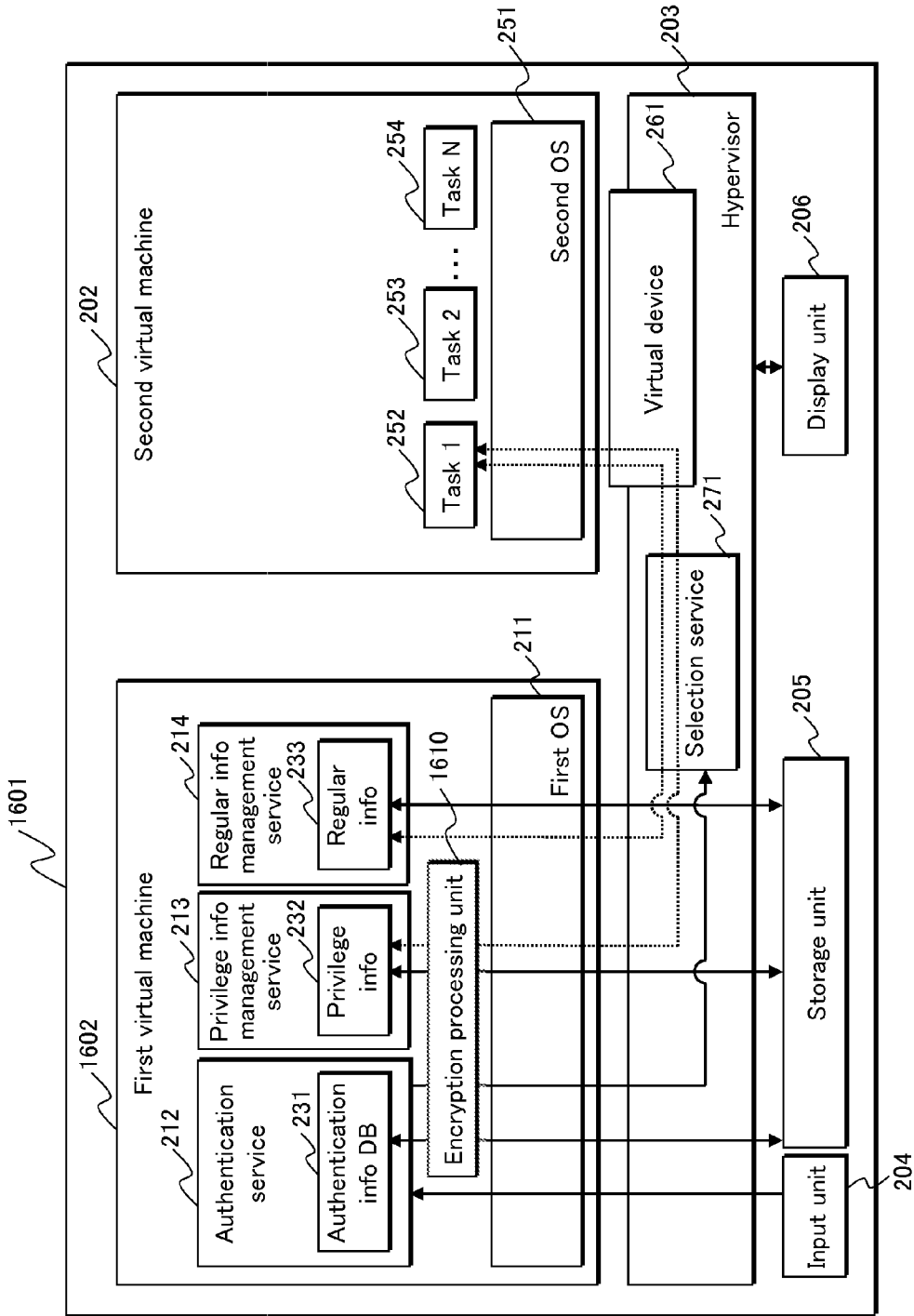
FIG. 16 is a diagram schematically illustrating the functional structure of a virtual machine system in a modification of the present invention.

FIG. 16 is a diagram illustrating the functional structure of a virtual machine system 1601 of the present modification. The virtual machine system 1601 has the same structure as the virtual machine system 100 illustrated in FIG. 2, except that it additionally includes an encryption processing unit 1610. The encryption processing unit 1610 includes, as hardware, an LSI for encryption and decryption processes. In a first virtual machine 1602, the authentication information DB 231 and the privilege information 232 are stored in the storage unit 205 after they are encrypted by the encryption processing unit 1610. Also, in the first virtual machine 1602, after the authentication information DB 231 or the privilege information 232 is read from the storage unit 205, it is decrypted by the encryption processing unit 1610 and then managed by the authentication service 212 and the privilege information management service 213.

With this structure, the authentication information DB 231 and the privilege information 232 are stored in the encrypted state in the storage unit 205. This reduces the possibility of the contents of the authentication information DB 231 and the privilege information 232 being understood even if the storage device 104 is physically removed from the virtual machine system 100 and data is read therefrom.

Furthermore, the encryption process may be performed on the first virtual machine 201 as a whole, not for each piece of information such as the authentication information DB 231 or the privilege information 232.

Figure 17:
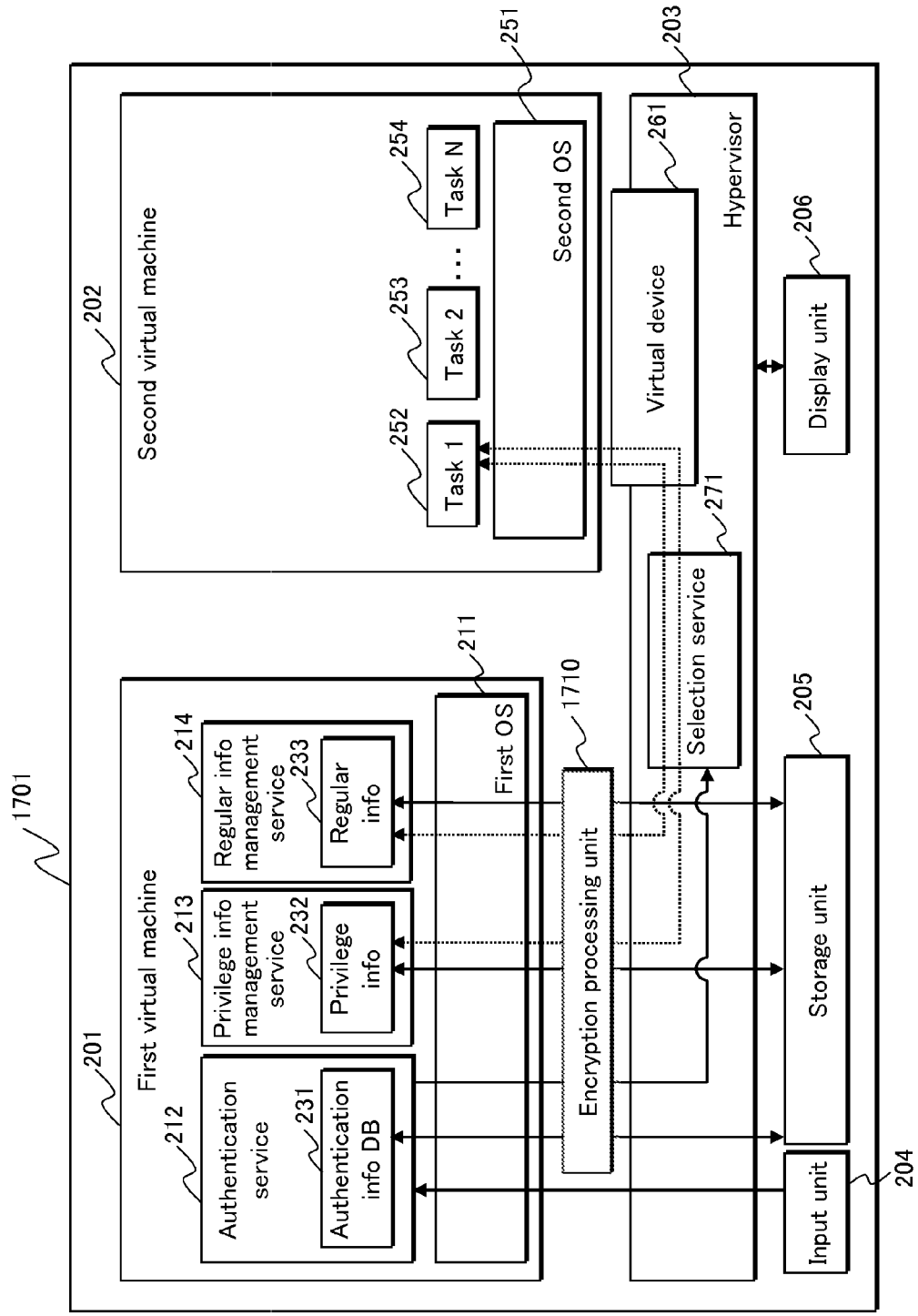
FIG. 17 is a diagram schematically illustrating the functional structure of a virtual machine system in a modification of the present invention.

A virtual machine system 1701 illustrated in FIG. 17 has the same structure as the virtual machine system 100 illustrated in FIG. 2, except that it additionally includes an encryption processing unit 1710.

Before storing, for example, the first OS 211 of the first virtual machine 201, the authentication service 212, the privilege information management service 213, the regular information management service 214, and the files used by the first OS 211 into the storage device 104, the virtual machine system 1701 causes the encryption processing unit 1710 to encrypt them. Also, after a program such as the first OS 211 of the first virtual machine 201 is read from the storage unit 205, the virtual machine system 1701 causes the encryption processing unit 1710 to decrypt the program before expanding it in the memory 122.

Furthermore, the encryption processing units 1710 and 1610 may be combined for use so that the whole first virtual machine can be encrypted by the encryption processing unit 1710 for the sake of protection, and the authentication information DB 231 and the privilege information 232 can be encrypted by the encryption processing unit 1610 for the sake of protection. Also, the authentication information DB 231 and the privilege information 232 may be encrypted by the encryption processing unit 1610 for the sake of protection, and all the remaining information may be encrypted by the encryption processing unit 1710 for the sake of protection.

Furthermore, the encryption processing units 1610 and 1710 may have different security strengths. In general, the higher the security strength is, the higher the processing load on the encryption is. In view of this, for example, when the authentication information DB 231 and the privilege information 232 are higher in confidentiality than the remaining information, the encryption processing unit 1610 may have higher security strength than the encryption processing unit 1710. This restricts the increase of the processing load on the encryption process to a necessary level, while improving the security strength compared with a case where only the encryption processing unit 1710 is used.

(15) In Embodiment 1, upon receiving an access request to access the virtual device from the second virtual machine 202, the hypervisor 203 refers to the second translation table and translates the virtual device address to a physical address of a storage area storing the privilege information 232. In this way, the hypervisor 203 enables the second virtual machine 202 to access the storage area identified by the physical address after the translation. However, it is sufficient that the second virtual machine 202 side can access a storage area managed by the first virtual machine 201 side, and a translation table such as the second translation table need not necessarily be used.

For example, a mechanism for allowing the second virtual machine 202 side to access a storage area managed by the first virtual machine 201 side may be realized by using a database. As one example of the database, the well-known relational database of the key value type may be used.

Figure 18:
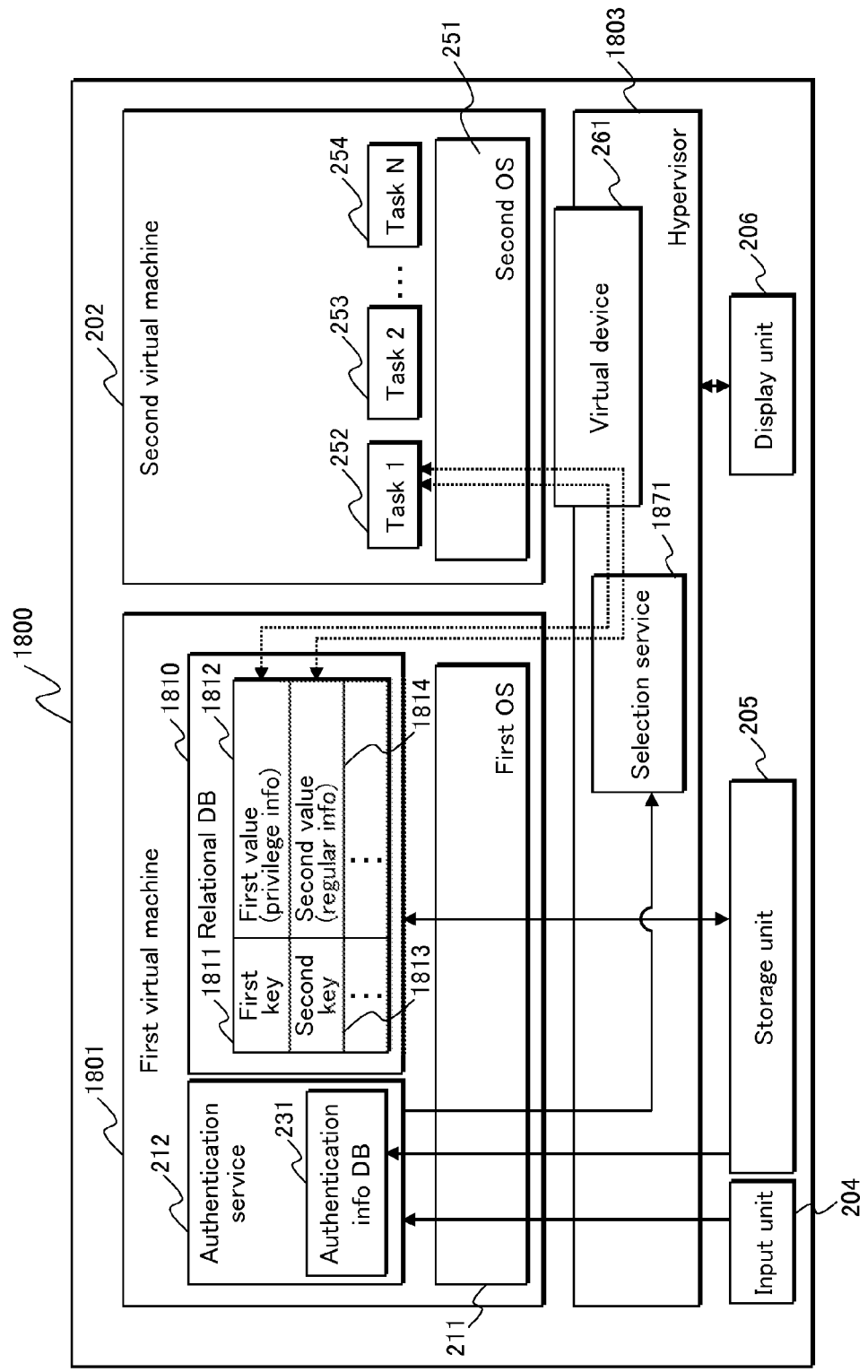
FIG. 18 is a diagram schematically illustrating the functional structure of a virtual machine system in a modification of the present invention.

FIG. 18 is a diagram illustrating the functional structure of a virtual machine system 1800 of the present modification.

The virtual machine system 1800 has almost the same structure as the virtual machine system 100 illustrated in FIG. 2, except that it includes a relational database (DB) 1810 in place of the privilege information management service 213 and the regular information management service 214.

The relational DB 1810 is assumed to be included in a first virtual machine 1801. It is also assumed that, when the relational DB 1810 is searched with use of a first key 1811, a first value 1812 is obtained, and when the relational DB 1810 is searched with use of a second key 1813, a second value 1814 is obtained.

A selection service 1871 of a hypervisor 1803 holds, in advance, a key corresponding to the case where the information selection signal indicates an authentication success (in the present modification, the key is the first key 1811), and a key corresponding to the case where the information selection signal indicates an authentication failure (in the present modification, the key is the second key 1813).

The selection service 1871 receives an information selection signal from the authentication service 212.

After this, when the second virtual machine 202 (the task 1 252) issues an access request (for example, a data read request) to access the virtual device, the selection service 1871 of the hypervisor 1803 selects the first key 1811 when the information selection signal indicates an authentication success, and selects the second key 1813 when the information selection signal indicates an authentication failure. The selection service 1871 then accesses the relational DB 1810 by using the selected key, and reads a value that is obtained by performing a search with use of the selected key. Subsequently, the selection service 1871 passes the obtained value to the second virtual machine 202.

Also, when the second virtual machine 202 issues a data write request as an access request to access the virtual device, the selection service 1871 selects the first key when the information selection signal indicates an authentication success, and selects the second key when the information selection signal indicates an authentication failure. The selection service 1871 then accesses the database by using the selected key, and writes the specified data to a storage area of a value corresponding to the key.

(16) A control program composed of program code written in a machine-language or high-level-language for causing the processor of the virtual machine system and various types of circuits connected with the processor to perform the authentication service process, mapping process, virtual device provision process and other processes described in the above embodiments may be recorded on a recording medium, or distributed via any of various types of communication paths. The above-mentioned recording medium may be an IC card, a hard disk, an optical disc, a flexible disk, a ROM, a flash memory or the like. The distributed control program is stored in a memory or the like so as to be read by a processor, and the processor executes the control program to realize the functions described in the above embodiments. Note that the processor may execute the control program directly or after compilation or interpretation by an interpreter.

(17) In the above embodiments, the privilege information is used as one example of the confidential information. However, not limited to this, it suffices to use any information that may be used under a certain condition.

(18) The functional structural elements described in the above embodiment (the first OS 211, authentication service 212, 911, privilege information management service 213, regular information management service 214, second OS 251, tasks 1 252 to N 254, hypervisor 203, 903, selection service 271, 971, input unit 204, storage unit 205, display unit 206, mailer 951, email management service 912, encryption processing unit 1610, 1710 or the like) may be realized as circuits that perform the respective functions, or realized as execution of one or more programs by one or more processors.

Note that each of the above-described functional structural elements is typically realized as an LSI that is an integrated circuit. Each of the above-described functional structural elements may be realized separately on one chip, or part or all of the functional structural elements may be achieved on one chip. Although the term LSI is used here, it may be called IC, system LSI, super LSI, ultra LSI or the like, depending on the level of integration. The method for realizing the integrated circuits is not limited to the LSI, but the integrated circuits may be realized by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI. Furthermore, a technology for an integrated circuit that replaces the LSI may appear in the near future as the semiconductor technology improves or branches into other technologies. In that case, the new technology may be used to integrate the functional blocks. Such possible technologies include biotechnology.

(19) The above-described embodiments and modifications may be combined partially.

4. Supplementary Notes

The following describes the structure of a virtual machine system as one embodiment of the present invention, and its modifications and effects.

(1) According to one aspect of the present invention, there is provided a virtual machine system comprising a computer that functions as a first virtual machine, a second virtual machine, and a hypervisor while a program is executed, the hypervisor controlling execution of the first virtual machine and the second virtual machine, the first virtual machine including: a storage unit storing confidential information; and an authentication unit configured to perform an authentication and notify the hypervisor of a result of the authentication, wherein the second virtual machine uses a virtual device that is a virtualized storage device, and when having received an authentication result indicating an authentication success from the authentication unit, the hypervisor enables the second virtual machine to access, as a substance of the virtual device, a storage area storing the confidential information, and when not having received the authentication result indicating the authentication success from the authentication unit, the hypervisor disables the second virtual machine from accessing the storage area storing the confidential information.

The storage unit is, as one example, the privilege information management service 213, email management service 912, or relational DB 1810 in the above embodiments.

With the above-described structure of the virtual machine system of the present invention, the second virtual machine does not have a mechanism for performing an authentication. Thus it is not possible for the second virtual machine to perform an unauthorized operation such as accessing the confidential information by pretending to have been authenticated successfully. The second virtual machine uses the virtual device without recognizing the authentication at all. Whether or not to allow the use of the confidential information is determined based on the result of the authentication performed by the authentication unit of the first virtual machine. Accordingly, the virtual machine system of the present invention can restrict the use of the confidential information by the second virtual machine only to the case where the authentication has resulted in success.

(2) In the above-described virtual machine system, regular information, which is different from the confidential information, may be stored in a storage area that is different from the storage area storing the confidential information, and when not having received the authentication result indicating the authentication success from the authentication unit, the hypervisor enables the second virtual machine to access, as the substance of the virtual device, the storage area storing the regular information.

With the above-described structure, it is possible to switch the information that can be used by the second virtual machine, between the confidential information and the regular information, based on the result of the authentication performed by the authentication unit of the first virtual machine.

(3) In the above-described virtual machine system, the hypervisor may enable the second virtual machine to access, as the substance of the virtual device, the storage area storing the regular information, regardless of whether or not having received the authentication result indicating the authentication success from the authentication unit, and when having received the authentication result indicating the authentication success from the authentication unit, the hypervisor may enable the second virtual machine to access the storage area storing the confidential information, in addition to the storage area storing the regular information.

With the above-described structure, the second virtual machine is always enabled to use the regular information. Furthermore, it is possible to control whether or not to allow access to the confidential information, based on the result of the authentication performed by the authentication unit of the first virtual machine.

(4) In the above-described virtual machine system, when having received the authentication result indicating the authentication success from the authentication unit, the hypervisor may make the virtual device correspond to the storage area storing the confidential information and then enables the second virtual machine to access the storage area storing the confidential information.

With the above-described structure, once the hypervisor sets this correspondence, it is possible to replace an access to the virtual device with an access to the storage area storing the confidential information, in accordance with the correspondence set by the hypervisor.

(5) In the above-described virtual machine system, the authentication unit may performs a user authentication as the authentication, and when the user authentication results in success, the authentication unit notifies the hypervisor of user identification information that identifies a user who has been authenticated successfully, in addition to the authentication result indicating the authentication success, the storage unit stores, as the confidential information, first user information and second user information, the first user information corresponding to first user identification information, the second user information corresponding to second user identification information, when having received the authentication result indicating the authentication success and the first user identification information from the authentication unit, the hypervisor enables the second virtual machine to access, as the substance of the virtual device, a storage area storing the first user information, and when having received the authentication result indicating the authentication success and the second user identification information from the authentication unit, the hypervisor enables the second virtual machine to access, as the substance of the virtual device, a storage area storing the second user information.

With the above-described structure, the second virtual machine can only access the virtual device to use user information corresponding to a user who has been authenticated successfully, without recognizing authentications performed on the first and second users.

(6) In the above-described virtual machine system, the confidential information may be a file, and when having received the authentication result indicating the authentication success from the authentication unit, the hypervisor enables the second virtual machine to access, as the substance of the virtual device, the file that is the confidential information, and when not having received the authentication result indicating the authentication success from the authentication unit, the hypervisor disables the second virtual machine from accessing the file that is the confidential information.

With the above-described structure, it is possible for the storage area storing the file to be made a target of access using the virtual device.

(7) In the above-described virtual machine system, the confidential information may be partial data that is part of data stored in a database, and when having received the authentication result indicating the authentication success from the authentication unit, the hypervisor enables the second virtual machine to access, as the substance of the virtual device, the partial data that is the confidential information, and when not having received the authentication result indicating the authentication success from the authentication unit, the hypervisor disables the second virtual machine from accessing the partial data that is the confidential information.

With the above-described structure, it is possible for the storage area storing the part of data stored in the database to be made a target of access using the virtual device.

(8) In the above-described virtual machine system, the confidential information may be data of one or more email corresponding to one account, and when having received the authentication result indicating the authentication success from the authentication unit, the hypervisor enables the second virtual machine to access, as the substance of the virtual device, the data of the one or more emails that is the confidential information, and when not having received the authentication result indicating the authentication success from the authentication unit, the hypervisor disables the second virtual machine from accessing the data of the one or more emails that is the confidential information.

With the above-described structure, it is possible for the data of the email to be made a target of access using the virtual device.

(9) According to another aspect of the present invention, there is provided a confidential information protection method for use in a virtual machine system including a computer that functions as a first virtual machine, a second virtual machine, and a hypervisor while a program is executed, the hypervisor controlling execution of the first virtual machine and the second virtual machine, the method comprising: a storage step in which a storage unit of the first virtual machine stores confidential information; an authentication step in which an authentication unit of the first virtual machine performs an authentication and notify the hypervisor of a result of the authentication; a usage step in which the second virtual machine uses a virtual device that is a virtualized storage device; and a control step in which, when having received an authentication result indicating an authentication success from the authentication unit, the hypervisor enables the second virtual machine to access, as a substance of the virtual device, a storage area storing the confidential information, and when not having received the authentication result indicating the authentication success from the authentication unit, the hypervisor disables the second virtual machine from accessing the storage area storing the confidential information.

With the above-described structure of the confidential information protection method of the present invention, the second virtual machine does not have a mechanism for performing an authentication. Thus it is not possible for the second virtual machine to perform an unauthorized operation such as accessing the confidential information by pretending to have been authenticated successfully. The second virtual machine uses the virtual device without recognizing the authentication at all. Whether or not to allow the use of the confidential information is determined based on the result of the authentication performed by the authentication unit of the first virtual machine. Accordingly, the virtual machine system of the present invention can restrict the use of the confidential information by the second virtual machine only to the case where the authentication has resulted in success.

(10) According to a further aspect of the present invention, there is provided a confidential information protection program for causing a computer to function as a virtual machine system including a virtual machine and a hypervisor that controls execution of the virtual machine and another virtual machine that uses a virtual device, the confidential information protection program causing the computer to function as: a storage unit storing confidential information; the virtual machine including an authentication unit configured to perform an authentication and notify the hypervisor of a result of the authentication; and the hypervisor that, when having received an authentication result indicating an authentication success from the authentication unit, enables the another virtual machine to access, as a substance of the virtual device, a storage area storing the confidential information, and when not having received the authentication result indicating the authentication success from the authentication unit, disables the another virtual machine from accessing the storage area storing the confidential information.

With the above-described structure of the virtual machine system of the present invention, the another virtual machine does not have a mechanism for performing an authentication. Thus it is not possible for the another virtual machine to perform an unauthorized operation such as accessing the confidential information by pretending to have been authenticated successfully. The another virtual machine uses the virtual device without recognizing the authentication at all. Whether or not to allow the use of the confidential information is determined based on the result of the authentication performed by the authentication unit of the virtual machine. Accordingly, the virtual machine system of the present invention can restrict the use of the confidential information by the another virtual machine only to the case where the authentication has resulted in success.

The virtual machine system in one embodiment of the present invention restricts the use of confidential information only to the case where an authentication has resulted in success, and is useful for an information device or the like that is expected to store a large amount of confidential information such as photographs, emails, and addresses.

REFERENCE SIGNS LIST 100, 900, 1601, 1701, 1800 virtual machine system
201, 901, 1602, 1801 first virtual machine
202, 902 second virtual machine
203, 903, 1803 hypervisor
204 input unit
205 storage unit
206 display unit
211 first OS
212, 911 authentication service
213 privilege information management service
214 regular information management service
231, 931 authentication information DB
232 privilege information
233 regular information
251 second OS
261 virtual device
271, 971, 1871 selection service
912 email management service
951 mailer
981 first email folder
991 second email folder

The invention claimed is:

1. A virtual machine system comprising a computer that functions as a first virtual machine, a second virtual machine, and a hypervisor while a program is executed, the hypervisor controlling execution of the first virtual machine and the second virtual machine, the first virtual machine being embodied as a first operating system, and including:
a storage unit storing confidential information; and
an authentication unit configured to perform an authentication and notify the hypervisor of a result of the authentication, wherein
the second virtual machine is embodied as a second operating system having a lower security function than the first operating system, and uses a virtual device that is a virtualized storage device, and
when having received an authentication result indicating an authentication success from the authentication unit, the hypervisor enables the second virtual machine to access, as an input and output of the virtual device, a storage area storing the confidential information and a storage area not storing the confidential information, and when not having received the authentication result indicating the authentication success from the authentication unit, the hypervisor disables the second virtual machine from accessing, as the input and output of the virtual device, the storage area storing the confidential information, and enables the second virtual machine to access, as the input and output of the virtual device, the storage area not storing the confidential information.

2. The virtual machine system of claim 1, wherein
when having received the authentication result indicating the authentication success from the authentication unit, the hypervisor makes the virtual device correspond to the storage area storing the confidential information and then enables the second virtual machine to access the storage area storing the confidential information.

3. The virtual machine system of claim 1, wherein
the authentication unit performs a user authentication as the authentication, and when the user authentication results in success, the authentication unit notifies the hypervisor of user identification information that identifies a user who has been authenticated successfully, in addition to the authentication result indicating the authentication success,
the storage unit stores, as the confidential information, first user information and second user information, the first user information corresponding to first user identification information, the second user information corresponding to second user identification information,
when having received the authentication result indicating the authentication success and the first user identification information from the authentication unit, the hypervisor enables the second virtual machine to access, as the input and output of the virtual device, a storage area storing the first user information, and when having received the authentication result indicating the authentication success and the second user identification information from the authentication unit, the hypervisor enables the second virtual machine to access, as the input and output of the virtual device, a storage area storing the second user information.

4. The virtual machine system of claim 1, wherein
the confidential information is a file, and
when having received the authentication result indicating the authentication success from the authentication unit, the hypervisor enables the second virtual machine to access, as the input and output of the virtual device, the file that is the confidential information, and when not having received the authentication result indicating the authentication success from the authentication unit, the hypervisor disables the second virtual machine from accessing the file that is the confidential information.

5. The virtual machine system of claim 1, wherein
the confidential information is partial data that is part of data stored in a database, and
when having received the authentication result indicating the authentication success from the authentication unit, the hypervisor enables the second virtual machine to access, as the input and output of the virtual device, the partial data that is the confidential information, and when not having received the authentication result indicating the authentication success from the authentication unit, the hypervisor disables the second virtual machine from accessing the partial data that is the confidential information.

6. The virtual machine system of claim 1, wherein
the confidential information is data of one or more emails corresponding to one account, and
when having received the authentication result indicating the authentication success from the authentication unit, the hypervisor enables the second virtual machine to access, as the input and output of the virtual device, the data of the one or more emails that is the confidential information, and when not having received the authentication result indicating the authentication success from the authentication unit, the hypervisor disables the second virtual machine from accessing the data of the one or more emails that is the confidential information.

7. A confidential information protection method for use in a virtual machine system including a computer that functions as a first virtual machine, a second virtual machine, and a hypervisor while a program is executed, the hypervisor controlling execution of the first virtual machine and the second virtual machine,
the method comprising:
a storage step in which a storage unit of the first virtual machine stores confidential information, the first virtual machine being embodied as a first operating system;
an authentication step in which an authentication unit of the first virtual machine performs an authentication and notify the hypervisor of a result of the authentication;
a usage step in which the second virtual machine, which is embodied as a second operating system having a lower security function than the first operating system, uses a virtual device that is a virtualized storage device; and
a control step in which, when having received an authentication result indicating an authentication success from the authentication unit, the hypervisor enables the second virtual machine to access, as an input and output of the virtual device, a storage area storing the confidential information and a storage area not storing the confidential information, and when not having received the authentication result indicating the authentication success from the authentication unit, the hypervisor disables the second virtual machine from accessing, as the input and output of the virtual device, the storage area storing the confidential information, and enables the second virtual machine to access, as the input and output of the virtual device, the storage area not storing the confidential information.

8. A non-transitory computer-readable recording medium storing a confidential information protection program for causing a computer to function as a virtual machine system including a virtual machine and a hypervisor that controls execution of the virtual machine and another virtual machine that uses a virtual device,
the confidential information protection program causing the computer to function as:
a storage unit storing confidential information;
the virtual machine including an authentication unit configured to perform an authentication and notify the hypervisor of a result of the authentication, the virtual machine being embodied as a first operating system and the another virtual machine being embodied as a second operating system having a lower security function than the first operating system; and
the hypervisor that, when having received an authentication result indicating an authentication success from the authentication unit, enables the another virtual machine to access, as an input and output of the virtual device, a storage area storing the confidential information and a storage area not storing the confidential information, and when not having received the authentication result indicating the authentication success from the authentication unit, disables the another virtual machine from accessing, as the input and output of the virtual device, the storage area storing the confidential information, and enables the second virtual machine to access, as the input and output of the virtual device, the storage area not storing the confidential information.

* * * * *